(12) United States Patent
Kohashi et al.

(10) Patent No.: US 10,605,669 B2
(45) Date of Patent: Mar. 31, 2020

(54) INFORMATION PROCESSING METHOD, INFORMATION PROCESSING SYSTEM, MOBILE TERMINAL, INFRARED DETECTOR, AND NON-TRANSITORY COMPUTER READABLE RECORDING MEDIUM STORING PROGRAM

(71) Applicant: Panasonic Intellectual Property Management Co., Ltd., Osaka (JP)

(72) Inventors: Yasuo Kohashi, Osaka (JP); Hiroko Sugimoto, Kyoto (JP); Yoichi Ikeda, Hyogo (JP); Kazuhiro Watanabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 15/830,223

(22) Filed: Dec. 4, 2017

(65) Prior Publication Data

US 2018/0164161 A1 Jun. 14, 2018

(30) Foreign Application Priority Data

Dec. 13, 2016 (JP) .................................. 2016-241141
Aug. 24, 2017 (JP) .................................. 2017-161361

(51) Int. Cl.
*G01J 5/10* (2006.01)
*G01J 5/52* (2006.01)
*G01J 5/00* (2006.01)

(52) U.S. Cl.
CPC .................. *G01J 5/10* (2013.01); *G01J 5/522* (2013.01); *G01J 2005/0048* (2013.01); *G01J 2005/0077* (2013.01)

(58) Field of Classification Search
CPC ...... G01J 5/10; G01J 5/522; G01J 2005/0048; G01J 2005/0077

(Continued)

(56) References Cited

U.S. PATENT DOCUMENTS

2012/0200698 A1* 8/2012 Baleine ..................... G01J 5/00
 348/142
2013/0230074 A1* 9/2013 Shin ....................... G01J 5/0025
 374/129

(Continued)

FOREIGN PATENT DOCUMENTS

| JP | 60-071919 | 4/1985 |
| JP | 2001-056126 | 2/2001 |
| JP | 2012-254222 | 12/2012 |

OTHER PUBLICATIONS

The Extended European Search Report dated May 17, 2018 for the related European Patent Application No. 17206322.4.

*Primary Examiner* — David P Porta
*Assistant Examiner* — Meenakshi S Sahu
(74) *Attorney, Agent, or Firm* — Greenblum & Bernstein, P.L.C.

(57) ABSTRACT

The infrared detector acquires measurement information which is obtained by measuring infrared radiant energy amount in a measuring range including a mobile terminal; acquires information indicating a reference temperature; detects infrared radiant energy distribution area indicating an area where the infrared radiant energy amount corresponding to the mobile terminal is measured out of the measuring range, based on measurement information; and calibrates a conversion table for converting infrared radiant energy amount to a temperature value based on infrared radiant energy amount in the detected infrared radiant energy distribution area and the reference temperature.

9 Claims, 25 Drawing Sheets

(58) Field of Classification Search
USPC .......................................................... 250/340
See application file for complete search history.

(56) References Cited

U.S. PATENT DOCUMENTS

2014/0104415 A1* 4/2014 Fox ..................... H04N 5/332
348/135
2014/0249690 A1* 9/2014 Park ..................... G06F 1/3206
700/300

* cited by examiner

FIG. 9

| INFRARED RADIANT ENERGY AMOUNT | TEMPERATURE VALUE |
|---|---|
| 0xFF | 127.5°C |
| 0xFE | 127.0°C |
| ⋮ | ⋮ |
| 0x60 | 48.0°C |
| ⋮ | ⋮ |
| 0x50 | 40.0°C |
| ⋮ | ⋮ |
| 0x02 | 1.0°C |
| 0x01 | 0.5°C |
| 0x00 | 0.0°C |

FIG. 13

| INFRARED RADIANT ENERGY AMOUNT | TEMPERATURE VALUE |
|---|---|
| 0xFF | 119.5°C |
| 0xFE | 119.0°C |
| ⋮ | ⋮ |
| 0x60 | 40.0°C |
| ⋮ | ⋮ |
| 0x50 | 32.0°C |
| ⋮ | ⋮ |
| 0x02 | -7.0°C |
| 0x01 | -7.5°C |
| 0x00 | -8.0°C |

INFORMATION PROCESSING METHOD, INFORMATION PROCESSING SYSTEM, MOBILE TERMINAL, INFRARED DETECTOR, AND NON-TRANSITORY COMPUTER READABLE RECORDING MEDIUM STORING PROGRAM

BACKGROUND

1. Technical Field

The present disclosure relates to an information processing method, an information processing system, a mobile terminal, an infrared detector, and a non-transitory computer readable recording medium storing a program, for an infrared detector that measures infrared radiant energy amount of a measuring target and converts the measured infrared radiant energy amount to a temperature value.

2. Description of the Related Art

An infrared detector that contactlessly detects temperature of a measuring target such as a person has been used. The infrared detector detects an infrared radiant energy amount radiated from the target, converts the detected infrared radiant energy amount to apparent temperature, and displays an image indicating the temperature distribution. For example, abnormality of the body temperature of a person can be detected from temperature distribution information.

The infrared detector uses a conversion table in which infrared radiant energy amount and temperature value are associated with each other to convert infrared radiant energy amount to a temperature value. Prior to shipment of the infrared detector from the factory, the conversion table is calibrated in consideration of the characteristic variation for each of infrared detectors so that infrared radiant energy amount can be converted to a correct temperature value.

However, the calibration work prior to shipment from the factory is a calibration work performed under ideal conditions excluding environmental conditions. For this reason, in an environment where the infrared detector is actually used, there is a problem that a correct temperature value cannot be acquired without a conversion table prepared in consideration of effects of ambient temperature, attenuation of infrared radiant energy amount according to the distance between the infrared detector and a measuring target, effects of reflection of infrared radiant energy amount due to room layout in the measurement place, and so on. Therefore, calibration methods under actually used environments have been proposed (see, for example, Japanese Examined Patent Application Publication No. 4-1859 and Japanese Patent Nos. 5398784 and 3725738).

SUMMARY

However, above conventional techniques need further improvements.

One non-limiting and exemplary embodiment provides an information processing method, an information processing system, a mobile terminal, an infrared detector, and a non-transitory computer readable recording medium storing a program, which enable temperature calibration of the infrared detector to be performed in an actually used environment at a low cost and in an easy manner.

In one general aspect, the techniques disclosed here feature an information processing method including: acquiring measurement information obtained by measuring infrared radiant energy amount in a measuring range including a mobile terminal; acquiring information indicating reference temperature; detecting an infrared radiant energy distribution area indicating an area where the infrared radiant energy amount corresponding to the mobile terminal is measured out of the measuring range, based on the measurement information; and calibrating a conversion table for converting infrared radiant energy amount to a temperature value, based on infrared radiant energy amount in the detected infrared radiant energy distribution area and the reference temperature.

The present disclosure enables to perform temperature calibration of the infrared detector in an actually used environment at a low cost and in an easy manner.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 illustrates an example of a first conversion table in the first embodiment;

FIG. 13 illustrates an example of the second conversion table in the first embodiment;

DETAILED DESCRIPTION

Figure 1:
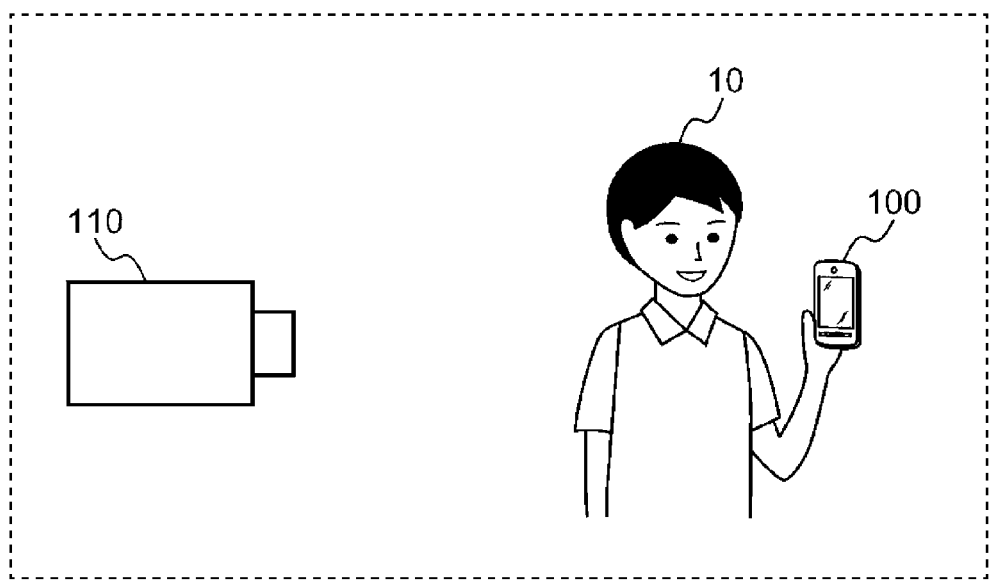
FIG. 1 illustrates a temperature calibration processing in an infrared detection system according to a first embodiment.

For example, Japanese Examined Patent Application Publication No. 4-1859 describes an infrared detector provided with a calibration unit including a black body part which radiates infrared ray corresponding to ambient temperature, a heat generating part which generates heat of a known temperature, and a transparent part for passing the infrared ray from a measuring target, wherein calibration work is performed with the black body part and heat generating part as necessary.

Further, for example, Japanese Patent No. 5398784 describes that a frame provided with a void corresponding to size of a face of a person being a subject is formed at a center part, a block body coating defining an area of temperature measurement is provided at least at one portion of the frame, and a thermography measuring temperature variation of a face of a person being a subject or head portion with no hair calibrates temperature variation of a human face or head with no hair with reference to ambient temperature indicated by the black body coating.

Further, for example, Japanese Patent No. 3725738 discloses a microwave oven which calibrates temperature data by detecting thermopile elements of an infrared sensor based on detected temperature relative to a sample of a known predetermined temperature placed within a measurement field of view of the infrared sensor, the sample of the known predetermined temperature being water of 0° C., a temperature of just dissolved ice, or iced water.

However, Japanese Examined Patent Application Publication No. 4-1859 has a problem in that since calibration work is not a work needed at any time, installing the calibration unit, which is not needed in regular measurements, in the infrared detector increases the cost of the infrared detector.

Further, Japanese Patent No. 5398784 has a problem in that the device is so large for calibration work and takes a time since a frame provided with a void corresponding to size of a face of a person needs to be fabricated for an exclusive use and the frame needs to be installed at the measurement place.

Further, Japanese Patent No. 3725738 has a problem in that although it is possible to perform calibration work using the sample in the microwave oven where only a sample of a known predetermined temperature exists, it is difficult to detect a heat source of the known predetermined sample in a room where people spend day-to-day life, due to existence of multiple heat sources.

An aspect of the present disclosure is an information processing method including: acquiring measurement information obtained by measuring infrared radiant energy amount in a measuring range including a mobile terminal; acquiring information indicating reference temperature; detecting an infrared radiant energy distribution area indicating an area where the infrared radiant energy amount corresponding to the mobile terminal is measured out of the measuring range, based on the measurement information; and calibrating a conversion table for converting infrared radiant energy amount to a temperature value, based on infrared radiant energy amount in the detected infrared radiant energy distribution area and the reference temperature.

According to this configuration, measurement information which is obtained by measuring infrared radiant energy amount in the measuring range including the mobile terminal is acquired; information indicating the reference temperature is acquired; infrared radiant energy distribution area corresponding to the mobile terminal is detected out of the measuring range, based on the measurement information; and the conversion table for converting infrared radiant energy amount to a temperature value is calibrated based on infrared radiant energy amount in the detected infrared radiant energy distribution area corresponding to the mobile terminal.

Since the infrared radiant energy distribution area corresponding to the mobile terminal is detected out of the measuring range, and the conversion table for converting infrared radiant energy amount in the detected infrared radiant energy distribution area and the reference temperature is calibrated, temperature calibration of the infrared detector in an actually used environment may be performed at a low cost and in an easy manner. Thus, even in a system where many infrared detectors exist, temperature calibration of the infrared detectors is possible, and thereby detection accuracy in the system may be improved as a whole.

Preferably, in the aspect of the present disclosure, the measurement information indicates distribution of infrared radiant energy amount in the measuring range, and the information processing method further includes: acquiring information indicating a size of the mobile terminal, in the detecting of the infrared radiant energy distribution area corresponding to the mobile terminal, a first area corresponding to the size of the mobile terminal is detected out of the measuring range, based on the measurement information, as the infrared radiant energy distribution area corresponding to the mobile terminal, and in the calibrating of the conversion table, the conversion table is calibrated based on a correspondence relationship between infrared radiant energy amount in the detected first area and the reference temperature.

According to this configuration, information indicating the size of the mobile terminal is acquired; and the first area corresponding to the size of the mobile terminal is detected out of the measuring range.

Thus, as the first area corresponding to the size of the mobile terminal is detected out of the measuring range, an infrared radiant energy distribution area corresponding to the mobile terminal is detected.

Preferably, in the aspect of the present disclosure, the measurement information indicates distribution of infrared radiant energy amount in the measuring range, the measurement information is acquired in different timings, in the detecting of the infrared radiant energy distribution area corresponding to the mobile terminal, a second area in which infrared radiant energy amount varies in a predetermined cycle is detected as the infrared radiant energy distribution area corresponding to the mobile terminal out of the measuring range, based on the measurement information acquired in the different timings, and in the calibrating of the conversion table, the conversion table is calibrated based on a correspondence relationship between infrared radiant energy amount in the detected second area and the reference temperature.

According to this configuration, the second area where the infrared radiant energy amount varies in a predetermined cycle is detected out of the measuring range as the infrared radiant energy distribution area corresponding to the mobile terminal, based on a temporal change of the distribution of infrared radiant energy amount indicated by the measurement information acquired in different timings; and the conversion table is calibrated based on a correspondence relationship between infrared radiant energy amount in the detected second area and the reference temperature.

Thus, by causing temperature of the mobile terminal to vary in a predetermined cycle, a second area where the infrared radiant energy amount varies in a predetermined cycle may be easily detected as an infrared radiant energy distribution area corresponding to the mobile terminal out of the measuring range, and the conversion table may be calibrated based on a correspondence relationship between infrared radiant energy amount in the second area and the reference temperature.

Preferably, in the aspect of the present disclosure, the measurement information is acquired in different timings, in the detecting of the infrared radiant energy distribution area corresponding to the mobile terminal, a second area which is the first area and in which infrared radiant energy amount varies in a predetermined cycle is detected as the infrared radiant energy distribution area corresponding to the mobile terminal, based on the measurement information acquired in the different timings, and in the calibrating of the conversion table, the conversion table is calibrated based on a correspondence relationship between infrared radiant energy amount in the detected second area and the reference temperature.

According to this configuration, the second area which is the first area and in which infrared radiant energy amount varies in a predetermined cycle is detected as the infrared radiant energy distribution area corresponding to the mobile terminal, and the conversion table is calibrated based on a correspondence relationship between infrared radiant energy amount in the detected second area and the reference temperature.

Thus, by causing temperature of the mobile terminal to vary in a predetermined cycle, an area of the size corresponding to the size of the mobile terminal and where infrared radiant energy amount varies in a predetermined cycle may be easily detected as an infrared radiant energy distribution area corresponding to the mobile terminal, and the conversion table may be calibrated based on a correspondence relationship between infrared radiant energy amount in this area and the reference temperature.

Preferably, in the aspect of the present disclosure, the reference temperature includes a first reference temperature and a second reference temperature which is lower than the first reference temperature, in the calibrating of the conversion table, the conversion table is calibrated based on a correspondence relationship between infrared radiant energy amount in the detected second area at a time when the infrared radiant energy amount in the predetermined cycle is high and the first reference temperature and on a correspondence relationship between infrared radiant energy amount in the second area at a time when the infrared radiant energy amount in the predetermined cycle is low and the second reference temperature.

According to this configuration, the reference temperature includes the first reference temperature and the second reference temperature lower than the first reference temperature; and the conversion table is calibrated based on a correspondence relationship between infrared radiant energy amount in the second area at a time when infrared radiant energy amount in the predetermined cycle is high and first reference temperature and on a correspondence relationship between infrared radiant energy amount in the second area at a time when infrared radiant energy amount in the predetermined cycle is low and the second reference temperature.

Thus, the conversion table is calibrated based on the two correspondence relationships, and thereby temperature of the infrared detector may be calibrated more accurately.

Preferably, in the aspect of the present disclosure, the measurement information indicates distribution of infrared radiant energy amount in the measuring range, the measurement information is acquired in different timings, in the detecting of the infrared radiant energy distribution area corresponding to the mobile terminal, a third area which moves in a predetermined moving pattern is detected as the infrared radiant energy distribution area corresponding to the mobile terminal out of the measuring range, based on the measurement information acquired in the different timings, and in the calibrating of the conversion table, the conversion table is calibrated based on a correspondence relationship between infrared radiant energy amount in the detected third area and the reference temperature.

According to this configuration, the third area which moves in a predetermined pattern is detected as the infrared radiant energy distribution area corresponding to the mobile terminal based on a temporal change of the distribution of infrared radiant energy amount indicated by the measurement information acquired in different timings; and the conversion table is calibrated based on a correspondence relationship between infrared radiant energy amount in the detected third area and the reference temperature.

Thus, the third area which moves in a predetermined moving pattern may be easily detected as an infrared radiant energy distribution area corresponding to the mobile terminal out of the measuring range, and the conversion table may be calibrated based on a correspondence relationship between infrared radiant energy amount in the third area and the reference temperature.

Preferably, in the aspect of the present disclosure, the measurement information is acquired in different timings, in the detecting of the infrared radiant energy distribution area corresponding to the mobile terminal, a third area which is the first area and which moves in a predetermined moving pattern is detected as the infrared radiant energy distribution area corresponding to the mobile terminal, based on the measurement information acquired in the different timings, and in the calibrating of the conversion table, the conversion table is calibrated based on a correspondence relationship between infrared radiant energy amount in the detected third area and the reference temperature.

According to this configuration, the third area which is the first area and which moves in a predetermined moving pattern is detected as the infrared radiant energy distribution area corresponding to the mobile terminal; and the conversion table is calibrated based on a correspondence relationship between infrared radiant energy amount in the detected third area and the reference temperature.

Thus, by causing the mobile terminal to move in a predetermined moving pattern, an area whose size corresponds to the size of the mobile terminal and which moves in a predetermined moving cycle may be easily detected as an infrared radiant energy distribution area corresponding to the mobile terminal out of the measuring range, and the conversion table may be calibrated based on a correspondence relationship between infrared radiant energy amount in this area and the reference temperature.

Preferably, in the aspect of the present disclosure, the reference temperature includes a first reference temperature and a second reference temperature which is lower than the first reference temperature; the moving pattern includes a first moving pattern and a second moving pattern which is different from the first moving pattern; in the detecting of the infrared radiant energy distribution area corresponding to the mobile terminal, a third area which moves in the second moving pattern after moving in the first moving pattern is detected as the infrared radiant energy distribution area corresponding to the mobile terminal out of the measuring range, based on the measurement information acquired in the different timings, and in the calibrating of the conversion table, the conversion table is calibrated based on a correspondence relationship between infrared radiant energy amount in the detected third area at the time of moving in the first moving pattern and the first reference temperature and on a correspondence relationship between infrared radiant energy amount in the third area at the time of moving in the second moving pattern and the second reference temperature.

According to this configuration, the reference temperature includes the first reference temperature and the second reference temperature lower than the first reference temperature; the moving pattern includes the first moving pattern and the second moving pattern which is different from the first moving pattern; the third area which moves in the second moving pattern after moving in the first moving pattern is detected as the infrared radiant energy distribution area corresponding to the mobile terminal out of the measuring range, based on a temporal change of infrared radiant energy amount indicated by the measurement information acquired in different timings; and the conversion table is calibrated based on a correspondence relationship between infrared radiant energy amount in the third area at the time of moving in the first moving pattern and the first reference temperature and on a correspondence relationship between infrared radiant energy amount in the third area at the time of moving in the second moving pattern and the second reference temperature.

Thus, the conversion table is calibrated based on the two correspondence relationships, and thereby temperature of the infrared detector may be calibrated more accurately.

Preferably, in the aspect of the present disclosure, the measurement information indicates distribution of infrared radiant energy amount in the measuring range, in the detecting of the infrared radiant energy distribution area corresponding to the mobile terminal, in a case where a fourth area which the first area and outside of which an infrared radiant energy distribution area of a specific shape is detected, the fourth area is detected as the infrared radiant energy distribution area corresponding to the mobile terminal, and in the calibrating of the conversion table, the conversion table is calibrated based on a correspondence relationship between infrared radiant energy amount in the detected fourth area and the reference temperature.

According to this configuration, in a case where the fourth area which the first area and outside of which the infrared radiant energy distribution area of the specific shape is detected, the fourth area is detected as the infrared radiant energy distribution area corresponding to the mobile terminal; and the conversion table is calibrated based on a correspondence relationship between infrared radiant energy amount in the detected fourth area and the reference temperature.

Thus, by causing the mobile terminal to be held in a specific shape, when the fourth area which the first area and outside of which the infrared radiant energy distribution area of the specific shape is detected, the fourth area may be easily detected as the infrared radiant energy distribution area corresponding to the mobile terminal, and the conversion table may be calibrated based on a correspondence relationship between infrared radiant energy amount in the detected fourth area and the reference temperature.

Another aspect of the present disclosure is an information processing system including: a mobile terminal; and an infrared detector, in which the mobile terminal includes: a temperature measuring unit which measures temperature of the mobile terminal; and a processing execution unit which controls heat generation amount of the mobile terminal by controlling arithmetic processing amount such that temperature of the mobile terminal becomes a predetermined reference temperature, and in which the infrared detector includes: an infrared measuring unit which measures infrared radiant energy amount in a measuring range including the mobile terminal; a storage unit which stores information indicating the reference temperature; a detector which detects infrared radiant energy distribution area indicating an area where the infrared radiant energy amount corresponding to the mobile terminal is measured out of the measuring range, based on the measured infrared radiant energy amount; and a calibration unit which calibrates a conversion table for converting infrared radiant energy amount to a temperature value based on infrared radiant energy amount in the detected infrared radiant energy distribution area and the reference temperature.

According to this configuration, the mobile terminal measures temperature of the mobile terminal; the mobile terminal controls the heat generation amount of the mobile terminal by controlling the arithmetic processing amount such that temperature of the mobile terminal becomes the reference temperature; the infrared detector measures infrared radiant energy amount in the measuring range including the mobile terminal; the storage unit of the infrared detector stores information indicating the reference temperature; the infrared detector detects an infrared radiant energy distribution area corresponding to the mobile terminal out of the measuring range, based on the measured infrared radiant energy amount; and the infrared detector calibrates a conversion table for converting infrared radiant energy amount to a temperature value based on infrared radiant energy amount in the detected infrared radiant energy distribution area and the reference temperature.

Since the infrared radiant energy distribution area corresponding to the mobile terminal is detected, and the conversion table for converting infrared radiant energy amount to a temperature value is calibrated based on infrared radiant energy amount in the detected infrared radiant energy distribution area and the reference temperature, temperature calibration of the infrared detector in an actually used environment may be performed at a low cost and in an easy manner. Thus, even in a system where many infrared detectors exist, temperature calibration of the infrared detectors is possible, and thereby detection accuracy in the system may be improved as whole.

Another aspect of the present disclosure is a mobile terminal including: a communication unit which communicates information indicating start of processing with an infrared detector; a temperature measuring unit which measures temperature of the mobile terminal; and a processing execution unit which controls heat generation amount of the mobile terminal by controlling arithmetic processing amount such that temperature of the mobile terminal becomes a predetermined reference temperature after communication of information indicating start of processing.

According to this configuration, information indicating start of the processing with the infrared detector is communicated; temperature of the mobile terminal is measured; and the heat generation amount of the mobile terminal is controlled by controlling the arithmetic processing amount such that temperature of the mobile terminal becomes a predetermined reference temperature.

Since the infrared radiant energy distribution area corresponding to the mobile terminal is detected, and the conversion table for converting infrared radiant energy amount to a temperature value is calibrated based on infrared radiant energy amount in the detected infrared radiant energy distribution area and the reference temperature, temperature calibration of the infrared detector in an actually used environment may be performed at a low cost and in an easy manner. Thus, even in a system where many infrared detectors exist, temperature calibration of the infrared detectors is possible, and thereby detection accuracy in the system may be improved as a whole.

Another aspect of the present disclosure is an infrared detector including: an infrared measuring unit which measures infrared radiant energy amount in a measuring range; a storage unit which stores information indicating a reference temperature; a detector which detects infrared radiant energy distribution area indicating an area where the infrared radiant energy amount corresponding to the mobile terminal is measured out of the measuring range, based on the measured infrared radiant energy amount; and a calibration unit which calibrates a conversion table for converting infrared radiant energy amount to a temperature value based on infrared radiant energy amount in the detected infrared radiant energy distribution area and the reference temperature.

According to this configuration, infrared radiant energy amount in the measuring range is measured; the storage unit stores information indicating the reference temperature; an infrared radiant energy distribution area corresponding to the mobile terminal is detected out of the measuring range, based on the measured infrared radiant energy amount; and a conversion table for converting infrared radiant energy amount to a temperature value is calibrated based on infrared radiant energy amount in the detected infrared radiant energy distribution area and the reference temperature.

Since the infrared radiant energy distribution area corresponding to the mobile terminal is detected, and the conversion table for converting infrared radiant energy amount to a temperature value is calibrated based on infrared radiant energy amount in the detected infrared radiant energy distribution area corresponding to the mobile terminal and the reference temperature, temperature calibration of the infrared detector in an actually used environment may be performed at a low cost and in an easy manner. Thus, even in a system where many infrared detectors exist, temperature calibration of the infrared detectors is possible, and thereby detection accuracy in the system may be improved as a whole.

Another aspect of the present disclosure is a non-transitory computer readable recording medium storing a program causing a computer of a mobile terminal to function as: a communication unit which communicates information indicating start of processing with an infrared detector; a temperature measuring unit which measures temperature of the mobile terminal; and a processing execution unit which controls heat generation amount of the mobile terminal by controlling arithmetic processing amount such that temperature of the mobile terminal becomes a predetermined reference temperature after communication of information indicating start of the processing.

According to this configuration, information indicating start of the processing with the infrared detector is communicated; temperature of the mobile terminal is measured; and the heat generation amount of the mobile terminal is controlled by controlling the arithmetic processing amount such that temperature of the mobile terminal becomes a predetermined reference temperature.

Since the infrared radiant energy distribution area corresponding to the mobile terminal is detected, and the conversion table for converting infrared radiant energy amount to a temperature value is calibrated based on infrared radiant energy amount in the detected infrared radiant energy distribution area and the reference temperature, temperature calibration of the infrared detector in an actually used environment may be performed at a low cost and in an easy manner. Thus, even in a system where many infrared detectors exist, temperature calibration of the infrared detectors is possible, and thereby detection accuracy in the system may be improved as a whole.

In the described-above aspect of the present disclosure, the processing execution unit repeats processing of causing the mobile terminal to generate heat up to a predetermined upper limit temperature by increasing the arithmetic processing amount, and then cooling the mobile terminal down to a predetermined lower limit temperature by stopping the arithmetic processing or decreasing the arithmetic processing amount in a predetermined cycle, and thereafter controls the arithmetic processing amount such that temperature of the mobile terminal is maintained at the reference temperature.

According to this configuration, the arithmetic processing amount is controlled to repeat processing of causing the mobile terminal to generate heat up to a predetermined upper limit temperature by increasing the arithmetic processing amount, and then cooling the mobile terminal down to a predetermined lower limit temperature by stopping the arithmetic processing or decreasing the arithmetic processing amount in a predetermined cycle, and thereafter control the arithmetic processing amount such that temperature of the mobile terminal is maintained at the reference temperature.

Thus, by causing temperature of the mobile terminal to vary in a predetermined cycle, an area corresponding to the mobile terminal may be easily detected out of the measuring range of infrared radiant energy amount, and the conversion table may be calibrated based on a relative relationship between infrared radiant energy amount in the area and the reference temperature.

Hereinafter, embodiments of the present disclosure are described with reference to the accompanying drawings. The embodiments described below are just examples embodying the present disclosure and do not limit the technical scope of the present disclosure.

First Embodiment

FIG. 1 illustrates a temperature calibration processing in an infrared detection system according to a first embodiment. In the temperature calibration processing according to the first embodiment, a user 10 holds a mobile terminal 100 and an infrared detector 110 detects infrared ray radiated from the mobile terminal 100. The infrared detection system is utilized for watching or monitoring a specific person such as, for example, an elderly person.

The mobile terminal 100 is, for example, a smartphone, a mobile phone, a tablet computer or a notebook personal computer. The infrared detector 110 measures infrared radiant energy amount of the measurement target and converts the measured infrared radiant energy amount to a temperature value. The infrared detector 110 stores a conversion table in which infrared radiant energy amount and temperature value are associated with each other and converts the measured infrared radiant energy amount to a temperature value based on the conversion table.

In the temperature calibration processing, the mobile terminal 100 causes an internal central processing unit (CPU) and/or a battery to generate heat by causing the CPU to execute arithmetic processing. In addition, the mobile terminal 100 includes a temperature sensor, and the temperature of the mobile terminal 100 is controlled to a predetermined reference temperature. The infrared detector 110 measures infrared radiant energy amount of the mobile terminal 100 generating heat at the reference temperature, and calibrates the conversion table based on the measured infrared radiant energy amount of the mobile terminal and the reference temperature.

The mobile terminal 100 may not necessarily be held by the user 10 and may be installed at a place where infrared radiant energy amount can be measured by the infrared detector 110.

Figure 2:
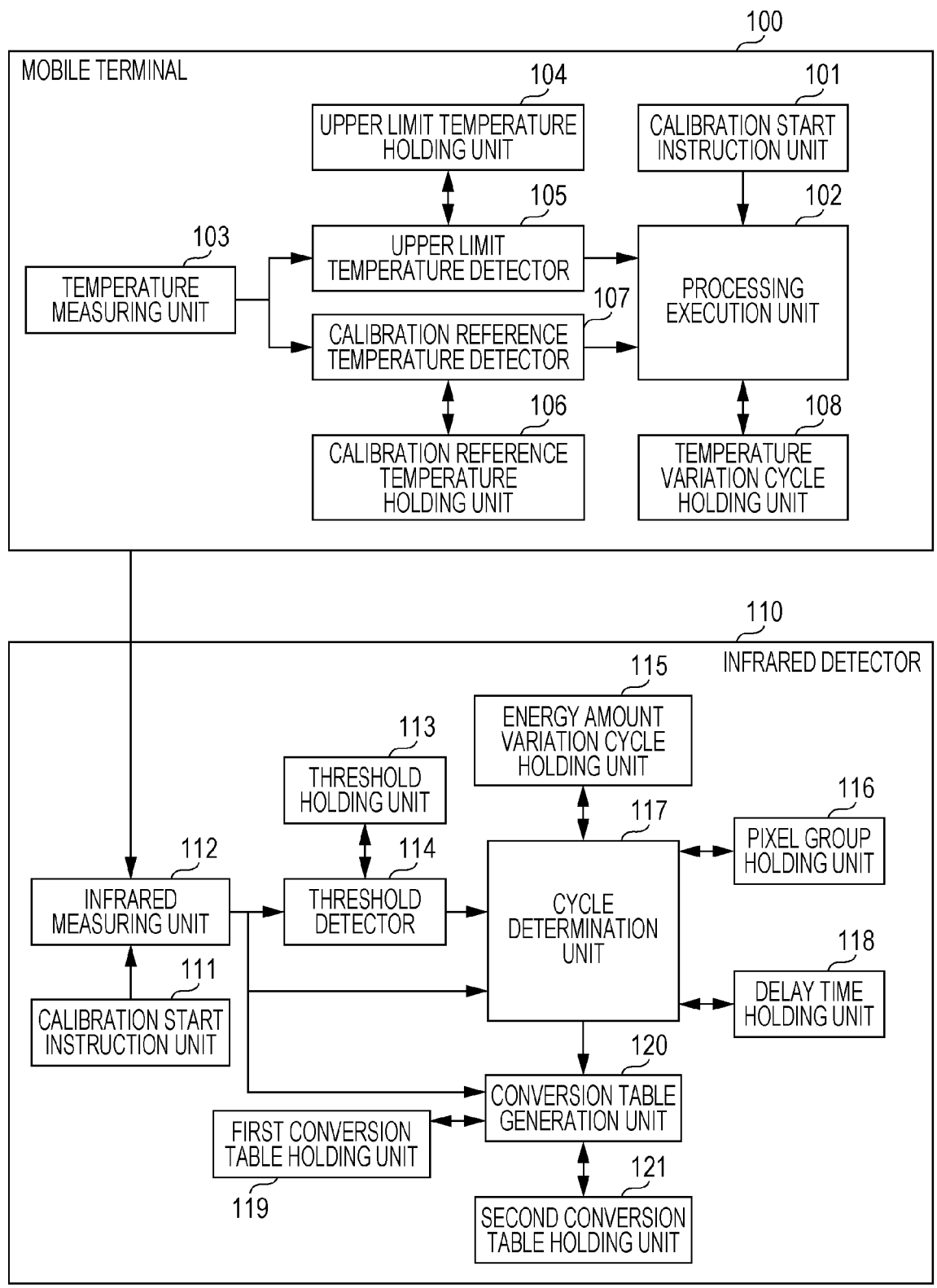
FIG. 2 illustrates a configuration of the infrared detection system according to the first embodiment.

FIG. 2 illustrates a configuration of an infrared detection system according to the first embodiment. The infrared detection system illustrated in FIG. 2 includes a mobile terminal 100 and an infrared detector 110.

The mobile terminal 100 includes a calibration start instruction unit 101, a processing execution unit 102, a temperature measuring unit 103, an upper limit temperature holding unit 104, an upper limit temperature detector 105, a calibration reference temperature holding unit 106, a calibration reference temperature detector 107, and a temperature variation cycle holding unit 108. The CPU functions as the calibration start instruction unit 101, processing execution unit 102, the upper limit temperature detector 105, and the calibration reference temperature detector 107 by executing a temperature control program stored in a memory.

The calibration start instruction unit 101 changes the mode of the mobile terminal 100 to the calibration mode and transmits calibration start instruction for starting calibration of the infrared detector 110 to the processing execution unit 102. For example, the mobile terminal 100 activates an application for calibrating the infrared detector 110 according to operating by the user 10 to change the mode to the calibration mode.

Upon receiving the calibration start instruction, the processing execution unit 102 executes temperature control processing to change temperature of the mobile terminal 100. The processing execution unit 102 controls the heat generation amount of the mobile terminal 100 by increasing or decreasing the arithmetic processing amount such that temperature of the mobile terminal 100 becomes a predetermined calibration reference temperature. The processing execution unit 102 increases the heat generation amount of the mobile terminal 100 by increasing the arithmetic processing amount and decreases the heat generation amount of the mobile terminal 100 by decreasing the arithmetic processing amount. The processing execution unit 102 performs natural cooling of the mobile terminal 100 by stopping arithmetic processing.

The temperature measuring unit 103 measures temperature of the mobile terminal 100. Alternatively, the temperature measuring unit 103 may measure temperature of the CPU as temperature of the mobile terminal 100, may measure temperature of the battery as temperature of the mobile terminal 100, or may measure a median between temperature of the CPU and temperature of the battery as temperature of the mobile terminal 100. Further, the temperature measuring unit 103 may calculate surface temperature of the mobile terminal 100 based on temperature of the CPU and temperature of the battery.

The upper limit temperature holding unit 104 holds in advance information indicating the upper limit temperature of the mobile terminal 100. The upper limit temperature detector 105 detects that temperature of the mobile terminal 100 has reached the upper limit temperature. The calibration reference temperature holding unit 106 holds in advance information indicating the calibration reference temperature of the mobile terminal 100. The calibration reference temperature detector 107 detects that temperature of the mobile terminal 100 has reached the calibration reference temperature.

The temperature variation cycle holding unit 108 holds in advance information indicating a cycle of repeating temperature variation processing in which the mobile terminal 100 is cooled down such that temperature thereof becomes lower than a predetermined threshold temperature by stopping arithmetic processing after causing the mobile terminal 100 to generate heat up to a predetermined upper limit temperature by increasing the arithmetic processing amount. More specifically, the temperature variation cycle holding unit 108 holds in advance a temperature variation cycle indicating a predetermined time of temperature variation processing and a predetermined frequency of the temperature variation processing. In the first embodiment, a temperature variation area corresponding to an area in which infrared radiant energy amount varies at regular intervals in an imaging area of the infrared detector 110 can be identified by causing temperature of the mobile terminal 100 to vary at regular intervals, and the temperature variation area can be identified as the position of the mobile terminal 100.

The processing execution unit 102 repeats the temperature variation processing of causing the mobile terminal 100 to generate heat up to a predetermined upper limit temperature by increasing the arithmetic processing amount, and then cooling the mobile terminal 100 down such that temperature of the mobile terminal 100 becomes lower than a predetermined threshold temperature by stopping arithmetic processing in a predetermined cycle, and thereafter increases or decreases the arithmetic processing amount such that the temperature of the mobile terminal 100 is maintained at the calibration reference temperature.

The processing execution unit 102 repeats a processing of causing the mobile terminal 100 to generate heat up to a predetermined upper limit temperature by increasing the arithmetic processing amount, and then cooling the mobile terminal 100 down to a predetermined lower limit temperature by stopping the arithmetic processing or decreasing the arithmetic processing amount, and thereafter controls the arithmetic processing amount such that temperature of the mobile terminal 100 is maintained at the calibration reference temperature.

The infrared detector 110 detects infrared radiant energy amount radiated from the imaging area including a target, converts the detected infrared radiant energy amount to apparent temperature, and outputs a temperature distribution image. The imaging area is also a measuring range of an infrared measuring unit 112 described later. Therefore, the imaging area may be referred to as the measuring range. The output temperature distribution image may be displayed on a display not illustrated.

The temperature distribution image is, for example, data indicated with the matrix, and the element included in the matrix is referred to as the pixel. Each of the multiple pixels corresponds to an area included in the measurement range. The above areas corresponding to different pixels are different from each other.

The infrared detector 110 includes a calibration start instruction unit 111, an infrared measuring unit 112, a threshold holding unit 113, a threshold detector 114, an energy amount variation cycle holding unit 115, a pixel group holding unit 116, a cycle determination unit 117, a delay time holding unit 118, a first conversion table holding unit 119, a conversion table generation unit 120, and a second conversion table holding unit 121.

The calibration start instruction unit 111 changes the mode of the infrared detector 110 to the calibration mode and transmits calibration start instruction for starting calibration of the infrared detector 110 to the infrared measuring unit 112. For example, the infrared detector 110 changes the mode to the calibration mode for calibrating the infrared detector 110 according to operating by the user 10.

The infrared measuring unit 112 is, for example, an infrared sensor, a thermography sensor or a thermal image sensor. Upon receiving the calibration start instruction, the infrared measuring unit 112 measures infrared radiant energy amount radiated from the measuring range including a target.

The infrared measuring unit 112 may, for example, measure and output infrared radiant energy amount radiated from an area in the measuring range corresponding to each of the multiple pixels included in the temperature distribution image. Note that the seize of the above area corresponding to each of the multiple pixels is sufficiently smaller than the size of the mobile terminal 100.

In the above configuration, the infrared measuring unit 112 measures infrared radiant energy amount for the above area corresponding to each of the multiple pixels, and thereby measurement information indicating the infrared radiant energy amount of the above area corresponding to each of the multiple pixels. The measurement information indicates distribution of infrared radiant energy amount in the measuring range. In the description below, the above area corresponding to each of the multiple pixels may be referred to as a pixel.

In a case where the position of the mobile terminal 100 is determined in advance, the infrared measuring unit 112 may obtain measurement information indicating only distribution of infrared radiant energy amount of the mobile terminal 100 by setting the size of the measuring range to the size of the mobile terminal 100 and by measuring such that the mobile terminal 100 is included in the measuring range. The infrared measuring unit 112 measures infrared radiant energy amount of the mobile terminal 100 generating heat at the calibration reference temperature.

The infrared measuring unit 112 may acquire measurement information repeatedly in different timings. Thus, temporal change of the distribution of infrared radiant energy amount in the measuring range may be checked with measurement information acquired in different timings.

The threshold holding unit 113 holds in advance information indicating the threshold value of infrared radiant energy amount measured by the infrared measuring unit 112. The threshold value of infrared radiant energy amount is, for example, infrared radiant energy amount corresponding to a temperature higher than normal temperature, or infrared radiant energy amount from which it may be determined whether a target is generating heat.

The threshold detector 114 detects whether infrared radiant energy amount of each pixel measured by the infrared measuring unit 112 exceeds a threshold value held by the threshold holding unit 113.

The energy amount variation cycle holding unit 115 holds in advance an energy amount variation cycle as information indicating the time interval and frequency in which the threshold detector 114 detects that infrared radiant energy amount exceeds the threshold value. More specifically, the mobile terminal 100 performs temperature variation processing in a predetermined time interval by a predetermined frequency based on a temperature variation cycle held by the temperature variation cycle holding unit 108. For this reason, the energy amount variation cycle holding unit 115 holds, as the energy amount variation cycle, information indicating a time interval between a time when the measured infrared radiant energy amount has exceeded infrared radiant energy amount corresponding to the threshold temperature and thereafter a newly measured infrared radiant energy amount becomes smaller than the threshold value of infrared radiant energy amount corresponding to the threshold temperature, and a time when a further measured infrared radiant energy amount exceeds the threshold value of infrared radiant energy amount corresponding to the threshold temperature, and a frequency in which the measured infrared radiant energy amount exceeds the threshold value of infrared radiant energy amount corresponding to the threshold temperature.

The pixel group holding unit 116 holds in advance a terminal area corresponding to information indicating the area of the pixel group where infrared radiant energy amount exceeds the threshold value and which corresponds to the mobile terminal 100, as information indicating the size of the mobile terminal 100.

The delay time holding unit 118 holds in advance a delay time corresponding to information indicating a period of time between a time when temperature of the mobile terminal 100 is varied in a predetermined cycle and a time when temperature of the mobile terminal 100 becomes the calibration reference temperature.

The cycle determination unit 117 acquires, from the infrared measuring unit 112, measurement information which is obtained by measuring infrared radiant energy amount of the mobile terminal 100. The cycle determination unit 117 detects infrared radiant energy amount distribution area of the mobile terminal 100 from the distribution of infrared radiant energy amount in the measuring range indicated by measurement information which is obtained by measuring infrared radiant energy amount of the mobile terminal 100. The infrared radiant energy distribution area corresponding to the mobile terminal 100 is an area where the infrared radiant energy amount radiated from the mobile terminal 100 is measured in the measuring range.

The cycle determination unit 117 acquires information indicating the size of the mobile terminal 100 from the pixel group holding unit 116. The cycle determination unit 117 detects a temperature variation area (first area) corresponding to the size of the mobile terminal 100 out of a measuring range indicated by measurement information. The cycle determination unit 117 detects a temperature variation area (second area) where infrared radiant energy amount varies in a predetermined cycle, out of the distribution of infrared radiant energy amount in the measuring range indicated by measurement information which is acquired in different timings.

The cycle determination unit 117 detects a temperature variation area which is a temperature variation area of the size corresponding to the mobile terminal 100 and in which infrared radiant energy amount varies in a predetermined cycle as an infrared radiant energy distribution area of the mobile terminal 100, out of the distribution of infrared radiant energy amount in the measuring range indicated by measurement information.

For example, the cycle determination unit 117 may check a temporal change of infrared radiant energy amount of each pixel in the measuring range by using two or more measurement information, and then detect, as an infrared radiant energy amount distribution area of the mobile terminal 100, a temperature variation area which is an area of the size corresponding to the mobile terminal 100 and in which infrared radiant energy amount varies and the variation occurs in a predetermined cycle, out of the measuring range.

Alternatively, for example, the cycle determination unit 117 may detect the second area as the infrared radiant energy distribution area of the mobile terminal 100 from the measuring range indicated by measurement information which is acquired in different timings.

The cycle determination unit 117 detects a temperature variation area where temperature varies in a predetermined cycle, out of the measuring range of infrared radiant energy amount. The cycle determination unit 117 determines whether area of the pixel group with infrared radiant energy amount detected by the threshold detector 114 exceeding the threshold value matches a terminal area held by the pixel group holding unit 116. When determined that the area of the pixel group detected by the threshold detector 114 matches the terminal area held by the pixel group holding unit 116, the cycle determination unit 117 identifies an area corresponding to the pixel group as the temperature variation area.

The cycle determination unit 117 determines whether infrared radiant energy amount of the temperature variation area varies in an energy amount variation cycle held by the energy amount variation cycle holding unit 115. When determined that infrared radiant energy amount of the temperature variation area varies in an energy amount variation cycle held by the energy amount variation cycle holding unit 115, upon elapse of a delay time held by the delay time holding unit 118, the cycle determination unit 117 outputs a conversion table generation signal instructing generation of the conversion table to the conversion table generation unit 120.

The first conversion table holding unit 119 holds a first conversion table generated by calibration of the infrared detector 110 on shipment from the factory. In the first conversion table, infrared radiant energy amount and temperature value are associated with each other.

The conversion table generation unit 120 calibrates the first conversion table for converting infrared radiant energy amount to a temperature value based on infrared radiant energy amount in the detected infrared radiant energy distribution area and the calibration reference temperature. The conversion table generation unit 120 calibrates the first conversion table for converting infrared radiant energy amount to a temperature value based on the measured infrared radiant energy amount of the mobile terminal 100 after elapse of the delay time and the calibration reference temperature. The conversion table generation unit 120 calibrates the first conversion table based on a correspondence relationship between infrared radiant energy amount in the detected temperature variation area and the calibration reference temperature. Upon receiving the conversion table generation signal from the cycle determination unit 117, the conversion table generation unit 120 calibrates the first conversion table based on a correspondence relationship between infrared radiant energy amount of one pixel in the temperature variation area and the calibration reference temperature, and generates a second conversion table.

The second conversion table holding unit 121 holds the second conversion table generated by the conversion table generation unit 120.

When the second conversion table is held by the second conversion table holding unit 121 in the temperature measurement mode in which temperature of the target is measured, infrared radiant energy amount is converted to a temperature value by using the second conversion table, and when the second conversion table is not held by the second conversion table holding unit 121, infrared radiant energy amount is converted to a corresponding temperature value by using the first conversion table.

Next, a temperature calibration method in the infrared detection system according to the first embodiment is described.

Figure 3:
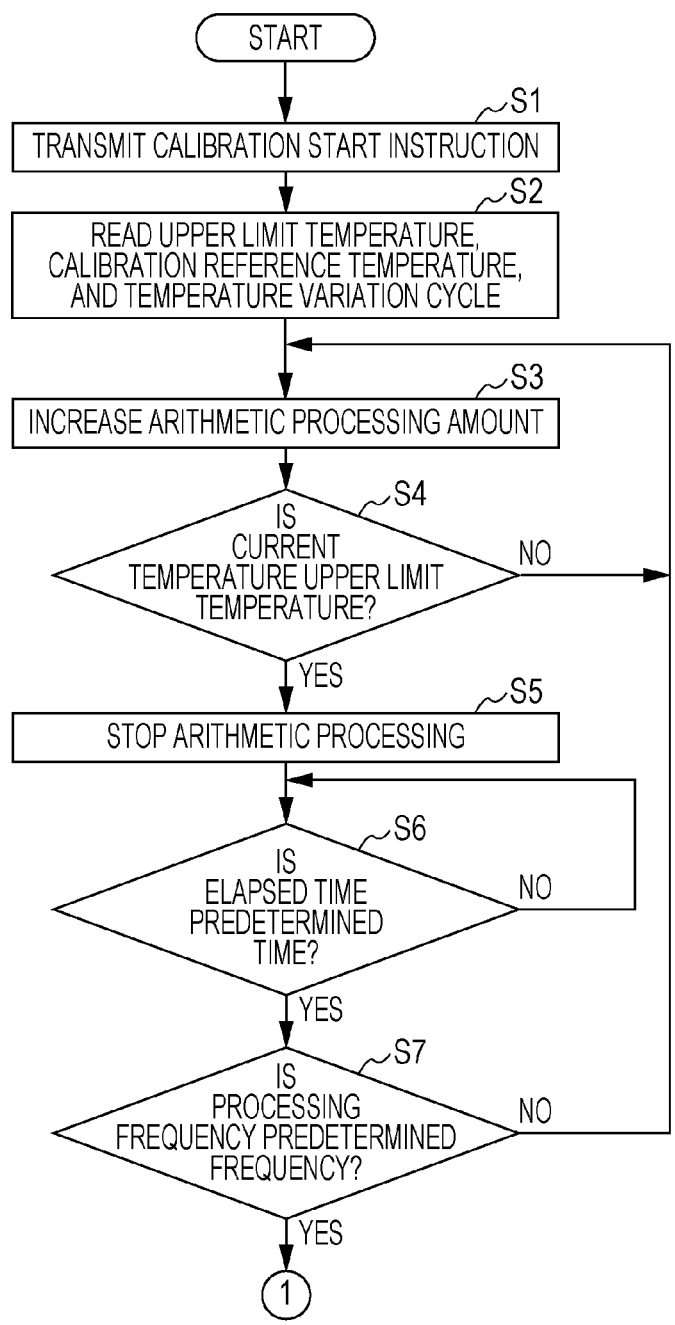
FIG. 3 is a first flowchart for illustrating the temperature calibration method in a mobile terminal of the infrared detection system according to the first embodiment.
Figure 4:
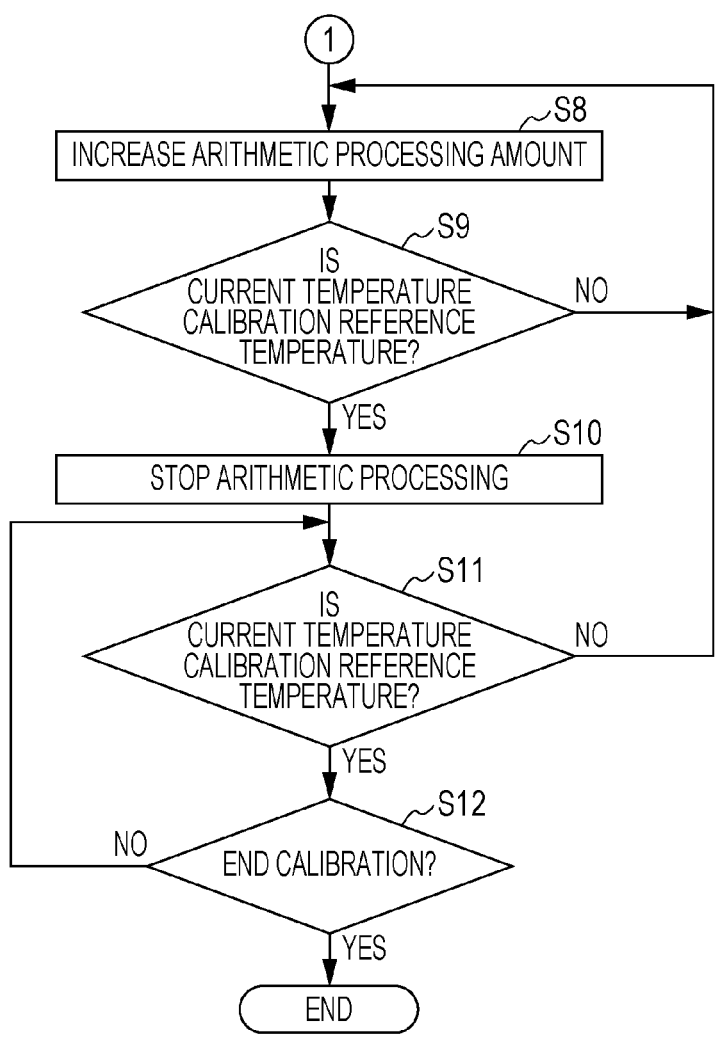
FIG. 4 is a second flowchart for illustrating the temperature calibration method in the mobile terminal of the infrared detection system according to the first embodiment.

FIG. 3 is a first flowchart for illustrating a temperature calibration method in the mobile terminal 100 of the infrared detection system according to the first embodiment. FIG. 4 is a second flowchart for illustrating a temperature calibration method in the mobile terminal 100 of the infrared detection system according to the first embodiment.

First, in the step S1, the calibration start instruction unit 101 transmits calibration start instruction for starting calibration of the infrared detector 110 to the processing execution unit 102.

Next, in the step S2, the upper limit temperature detector 105 reads upper limit temperature from the upper limit temperature holding unit 104, the calibration reference temperature detector 107 reads calibration reference temperature from the calibration reference temperature holding unit 106, and the processing execution unit 102 reads temperature variation cycle from the temperature variation cycle holding unit 108.

Next, in the step S3, the processing execution unit 102 increases the arithmetic processing amount. As the arithmetic processing amount increases, temperature of the CPU and/or battery rises and thereby surface temperature of the mobile terminal 100 rises.

Next, in the step S4, the upper limit temperature detector 105 determines whether current temperature of the mobile terminal 100 measured by the temperature measuring unit 103 is the upper limit temperature. When determined that the current temperature is the upper limit temperature, the upper limit temperature detector 105 detects that temperature of the mobile terminal 100 has reached the upper limit temperature and notifies the processing execution unit 102 that temperature of the mobile terminal 100 has reached the upper limit temperature.

In this step, when determined that the current temperature is not the upper limit temperature (step S4: NO), processing returns to the step S3, and the processing execution unit 102 increases the arithmetic processing amount.

Meanwhile, when determined that the current temperature is the upper limit temperature (step S4: YES), the processing execution unit 102 stops arithmetic processing in the step S5. As the arithmetic processing is stopped, temperature of the CPU and/or battery goes down and thereby surface temperature of the mobile terminal 100 goes down.

Next, in the step S6, the processing execution unit 102 determines whether a predetermined time has passed. The processing execution unit 102 determines whether time elapsed from the time when temperature of the mobile terminal 100 exceeded the threshold temperature has reached a predetermined time. The predetermined threshold temperature is a temperature at which temperature rise of the mobile terminal 100 can be measured, or for example, a temperature lower than the upper limit temperature and calibration reference temperature and higher than normal temperature. The predetermined time is a time taken until temperature of the mobile terminal 100 becomes lower than the threshold temperature. In this step, when determined that the elapsed time has not reached the predetermined time (step S6: NO), processing of the step S6 is repeated until the elapsed time reaches the predetermined time.

Meanwhile, when determined that the elapsed time has reached the predetermined time (step S6: YES), in the step S7, the processing execution unit 102 increases temperature of the mobile terminal 100 up to the upper limit temperature and then determines whether frequency of lowering temperature of the mobile terminal 100 has reached a predetermined frequency. In this step, when determined that the frequency of processing has not reached a predetermined frequency (step S7: NO), processing returns to the step S3, and the processing execution unit 102 increases the arithmetic processing amount.

Meanwhile, when determined that the frequency of processing has reached a predetermined frequency (step S7: YES), in the step S8, the processing execution unit 102 increases the arithmetic processing amount.

Next, in the step S9, the calibration reference temperature detector 107 determines whether current temperature of the mobile terminal 100 measured by the temperature measuring unit 103 is the calibration reference temperature. When determined that the current temperature is the calibration reference temperature, the calibration reference temperature detector 107 detects that temperature of the mobile terminal 100 has reached the calibration reference temperature and notifies the processing execution unit 102 that temperature of the mobile terminal 100 has reached the calibration reference temperature.

In this step, when determined that the current temperature is not the calibration reference temperature (step S9: NO), processing returns to the step S8, and the processing execution unit 102 increases the arithmetic processing amount.

Meanwhile, when determined that the current temperature is the calibration reference temperature (step S9: YES), the processing execution unit 102 stops arithmetic processing in the step S10. By stopping the arithmetic processing, surface temperature of the mobile terminal 100 is controlled so as not to rise higher than the calibration reference temperature.

Next, in the step S11, the calibration reference temperature detector 107 determines whether current temperature of the mobile terminal 100 measured by the temperature measuring unit 103 is the calibration reference temperature. When determined that the current temperature is the calibration reference temperature, the calibration reference temperature detector 107 detects that temperature of the mobile terminal 100 has reached the calibration reference temperature and notifies the processing execution unit 102 that temperature of the mobile terminal 100 has reached the calibration reference temperature.

In this step, when determined that the current temperature is not the calibration reference temperature (step S11: NO), processing returns to the step S8, and the processing execution unit 102 increases the arithmetic processing amount.

Meanwhile, when determined that the current temperature is the calibration reference temperature (step S11: YES), in the step S12, the processing execution unit 102 determines whether to end calibration. Thus, temperature of the mobile terminal 100 is maintained at the calibration reference temperature by repeating the processing of increasing the arithmetic processing amount, the processing of determining whether current temperature is the calibration reference temperature, and the processing of stopping arithmetic processing. For example, the processing execution unit 102 determines to end calibration when application for calibrating the infrared detector 110 is ended in response to operating by the user 10. The processing execution unit 102 may determine to end calibration after a predetermined time has passed since current temperature is determined to be the calibration reference temperature.

In this step, when determined not to end calibration (step S12: NO), processing returns to the step S11, and the calibration reference temperature detector 107 determines whether current temperature of the mobile terminal 100 measured by the temperature measuring unit 103 is the calibration reference temperature.

Meanwhile, when determined to end calibration (step S12: YES), the processing execution unit 102 ends temperature calibration processing of the mobile terminal 100.

Figure 5:
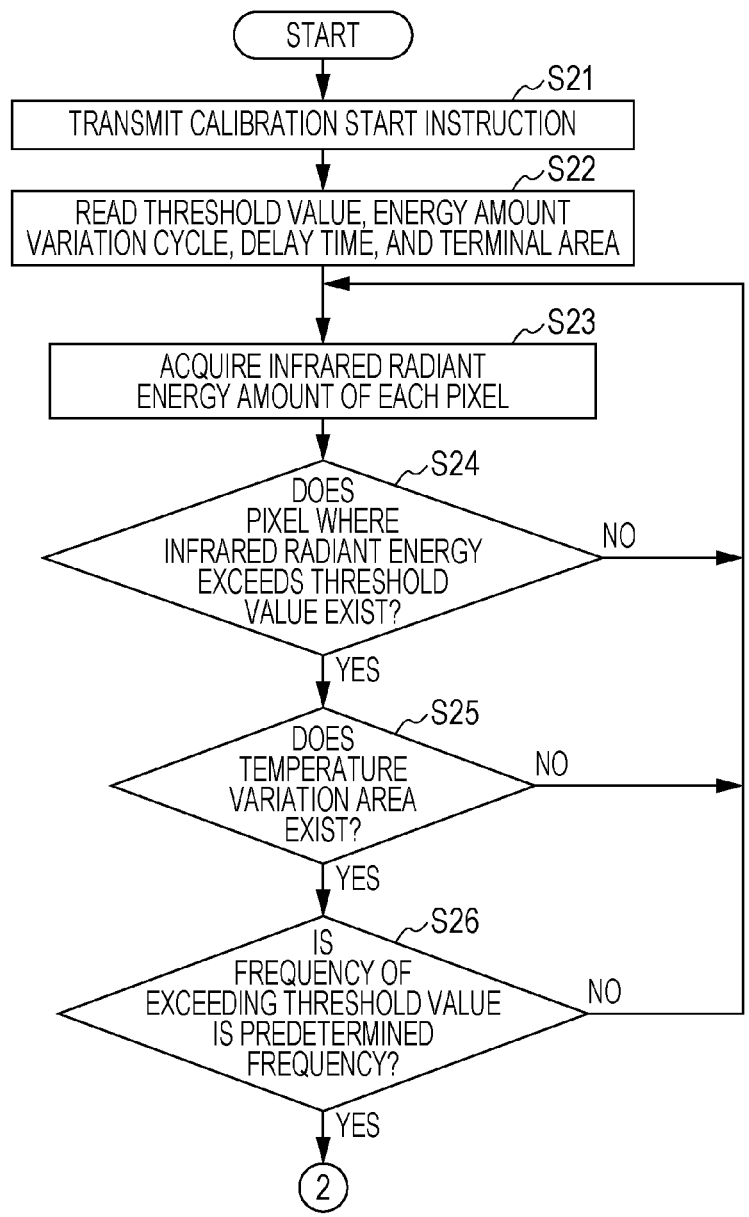
FIG. 5 is a first flowchart for illustrating a temperature calibration method in the infrared detector of the infrared detection system according to the first embodiment.
Figure 6:
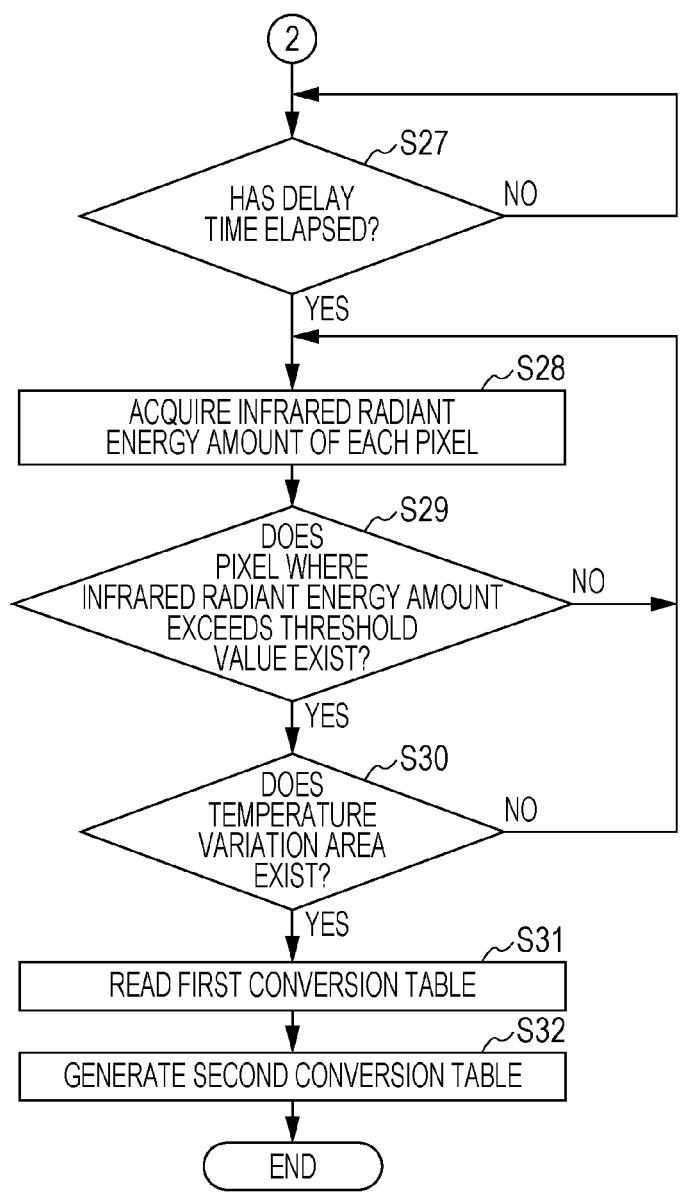
FIG. 6 is a second flowchart for illustrating the temperature calibration method in the infrared detector of the infrared detection system according to the first embodiment.

FIG. 5 is a first flowchart for illustrating the temperature calibration method in the infrared detector 110 of the infrared detection system according to the first embodiment. FIG. 6 is a second flowchart for illustrating the temperature calibration method in the infrared detector 110 of the infrared detection system according to the first embodiment.

First, in the step S21, the calibration start instruction unit 111 transmits calibration start instruction for starting calibration of the infrared detector 110 to the infrared measuring unit 112.

Next, in the step S22, the threshold detector 114 reads a threshold value of infrared radiant energy amount from the threshold holding unit 113, and the cycle determination unit 117 reads an energy amount variation cycle from the energy amount variation cycle holding unit 115, reads a delay time from the delay time holding unit 118, and reads a terminal area from the pixel group holding unit 116. The value of a counter (not illustrated) in the infrared detector 110 is 0.

Next, in the step S23, the threshold detector 114 acquires measurement information indicating infrared radiant energy amount of each pixel in the measuring range measured by the infrared measuring unit 112.

Next, in the step S24, the threshold detector 114 determines whether a pixel where infrared radiant energy amount exceeds the threshold value exists in the measuring range. The threshold value is, for example, infrared radiant energy amount corresponding to a temperature higher than normal temperature. In this step, when determined that a pixel where infrared radiant energy amount exceeds the threshold value does not exist in the measuring range (step S24: NO), processing returns to the step S23, and the threshold detector 114 newly acquires measurement information indicating infrared radiant energy amount of each pixel in the measuring range newly measured by the infrared measuring unit 112.

Meanwhile, when determined that a pixel where infrared radiant energy amount exceeds the threshold value exists in the measuring range (step S24: YES), in the step S25, the cycle determination unit 117 determines whether the temperature variation area exists in the measuring range. The cycle determination unit 117 determines whether the area of the pixel group with infrared radiant energy amount detected by the threshold detector 114 exceeding the threshold value matches a terminal area held by the pixel group holding unit 116. When determined that the area of the pixel group detected by the threshold detector 114 matches the terminal area held by the pixel group holding unit 116, the cycle determination unit 117 identifies the pixel group as the temperature variation area and determines that the temperature variation area exists.

The area of the pixel group detected by the threshold detector 114 and the terminal area do not need to completely match each other, but may match substantially. Since the area of the pixel group corresponding to the mobile terminal 100 varies depending on the distance between the infrared detector 110 and the mobile terminal 100, the distance between the infrared detector 110 and the mobile terminal 100 is preferably a predetermined distance.

The pixel group holding unit 116 may hold in advance the shape of the pixel group where infrared radiant energy amount exceeds the threshold value and corresponding to the mobile terminal 100 as a terminal shape corresponding to information indicating the shape of the mobile terminal 100. The cycle determination unit 117 may determine whether the shape of the pixel group where infrared radiant energy amount detected by the threshold detector 114 exceeds the threshold value matches the terminal area held by the pixel group holding unit 116. In this case, when determined that the shape of the pixel group detected by the threshold detector 114 matches the terminal area held by the pixel group holding unit 116, the cycle determination unit 117 identifies the pixel group as the temperature variation area.

In this step, when determined that the temperature variation area does not exist in the measuring range (step S25: NO), processing returns to the step S23, and the threshold detector 114 newly acquires measurement information indicating infrared radiant energy amount of each pixel in the measuring range newly measured by the infrared measuring unit 112.

Meanwhile, when determined that the temperature variation area exists (step S25: YES), the value of the counter (not illustrated) is incremented by 1. In the step S26, the cycle determination unit 117 determines based on the value of the counter whether frequency in which infrared radiant energy amount of one pixel in the temperature variation area exceeds the threshold value is a predetermined frequency. One pixel in the temperature variation area is, for example, a pixel at the center of the temperature variation area.

In this step, when determined that frequency in which infrared radiant energy amount of one pixel exceeds the threshold value is not a predetermined frequency (step S26: NO), processing returns to the step S23, and the threshold detector 114 newly acquires measurement information indicating infrared radiant energy amount of each pixel in the measuring range newly measured by the infrared measuring unit 112.

Meanwhile, when determined that frequency in which infrared radiant energy amount of one pixel exceeds the threshold value is a predetermined frequency (step S26: YES), the above temperature variation area in the measuring range is detected as the infrared radiant energy distribution area of the mobile terminal 100. In the step S27, the cycle determination unit 117 starts operation of a timer (not illustrated) and determines whether a predetermined delay time has elapsed from the time when the timer has started.

In this step, when determined that the delay time has not elapsed (step S27: NO), processing of the step S27 is repeated until the delay time elapses.

Meanwhile, when determined that the delay time has elapsed (step S27: YES), in the step S28, the threshold detector 114 newly acquires measurement information indicating infrared radiant energy amount of each pixel in the measuring range newly measured by the infrared measuring unit 112.

Next, in the step S29, the threshold detector 114 determines whether a pixel where infrared radiant energy amount exceeds the threshold value exists. In this step, when determined that a pixel in which infrared radiant energy amount exceeds the threshold value does not exist (step S29: NO), processing returns to the step S28, and the threshold detector 114 newly acquires measurement information indicating infrared radiant energy amount of each pixel in the measuring range newly measured by the infrared measuring unit 112.

Meanwhile, when determined that a pixel in which infrared radiant energy amount exceeds the threshold value exists (step S29: YES), in the step S30, the cycle determination unit 117 determines whether the temperature variation area exists. The cycle determination unit 117 determines whether the area of the pixel group where infrared radiant energy amount detected by the threshold detector 114 exceeds the threshold value matches a terminal area held by the pixel group holding unit 116. When determined that the area of the pixel group detected by the threshold detector 114 matches the terminal area held by the pixel group holding unit 116, the cycle determination unit 117 identifies the pixel group as the temperature variation area and determines that the temperature variation area exists.

In this step, when determined that the temperature variation area does not exist (step S30: NO), processing returns to the step S28, and the threshold detector 114 newly acquires measurement information indicating infrared radiant energy amount of each pixel in the measuring range newly measured by the infrared measuring unit 112.

Meanwhile, when determined that the temperature variation area exists (step S30: YES), the temperature variation area is detected as an infrared radiant energy distribution area of the mobile terminal 100 in the measuring range. In the step S31, the conversion table generation unit 120 reads the first conversion table from the first conversion table holding unit 119.

Next, in the step S32, the conversion table generation unit 120 calibrates the first conversion table for converting infrared radiant energy amount to a temperature value based on infrared radiant energy amount of one pixel in the identified temperature variation area and the calibration reference temperature, and generates the second conversion table. The conversion table generation unit 120 stores the generated second conversion table into the second conversion table holding unit 121.

Figure 7:
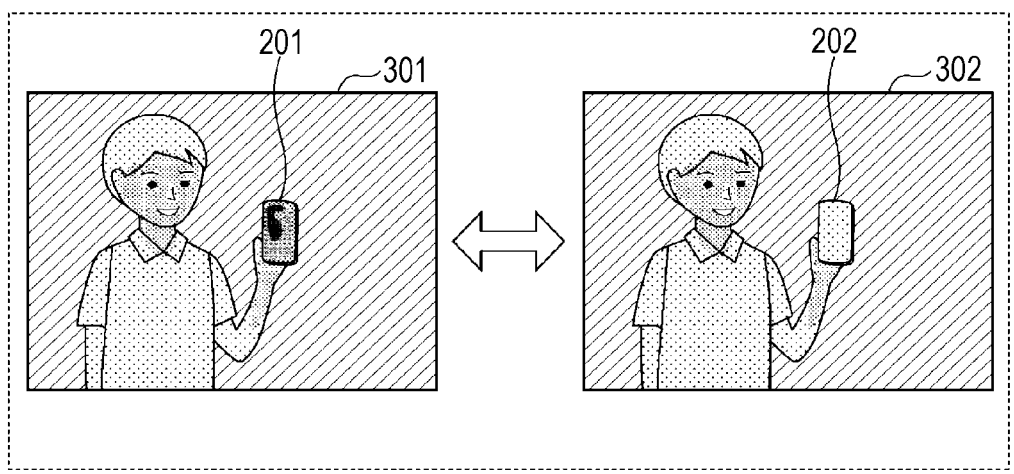
FIG. 7 illustrates an example of a temperature distribution image measured by the infrared measuring unit when temperature of the mobile terminal is an upper limit temperature, and a temperature distribution image measured by the infrared measuring unit when temperature of the mobile terminal is lower than a threshold temperature in the first embodiment.

FIG. 7 illustrates an example of a temperature distribution image measured by the infrared measuring unit when temperature of the mobile terminal is the upper limit temperature, and a temperature distribution image measured by the infrared measuring unit when temperature of the mobile terminal is lower than the threshold temperature in the first embodiment.

A temperature distribution image 301 illustrated in FIG. 7 is a temperature distribution image measured by the infrared measuring unit 112 when temperature of the mobile terminal 100 is the upper limit temperature, and hatching indicates that temperature of the pixel in a portion corresponding to the mobile terminal 100 is high. A temperature distribution image 302 is a temperature distribution image measured by the infrared measuring unit 112 when temperature of the mobile terminal 100 is lower than the threshold value, and hatching indicates that temperature of the pixel in a portion corresponding to the mobile terminal 100 is low. The temperature distribution images 301 and 302 are represented by temperature distributions of different colors. In FIG. 7, the temperature distribution is represented by hatching. A temperature variation area 201 of the temperature distribution image 301 is a pixel group where infrared radiant energy amount indicating the upper limit temperature is measured, and a temperature variation area 202 of the temperature distribution image 302 is a pixel group where infrared radiant energy amount indicating temperature lower than the threshold value is measured.

In the first embodiment, temperature variation areas corresponding to the mobile terminal 100 in the temperature distribution image may be identified by alternately measuring the temperature distribution image 301 and the temperature distribution image 302 by a predetermined frequency. Then, after temperature of the mobile terminal 100 is controlled so as to be the calibration reference temperature, the first calibration reference table for converting infrared radiant energy amount to a temperature value is calibrated based on infrared radiant energy amount of the temperature variation area identified out of the measuring range indicated by newly acquired measurement information and the calibration reference temperature.

Figure 8:
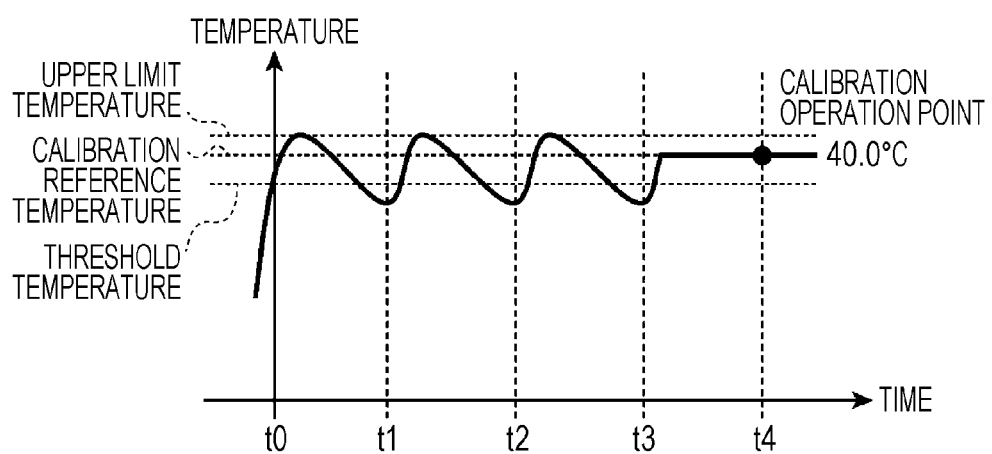
FIG. 8 illustrates a relationship between temperature of the mobile terminal and time in the first embodiment.

FIG. 8 illustrates a relationship between temperature of the mobile terminal and time in the first embodiment. In FIG. 8, the horizontal axis represents the time, and the vertical axis represents the temperature.

As illustrated in FIG. 8, in the first embodiment, temperature variation processing of cooling down the mobile terminal 100 is performed three times by causing the mobile terminal 100 to generate heat up to the upper limit temperature by increasing the arithmetic processing amount and then stopping the arithmetic processing. Thereafter, the arithmetic processing amount is controlled such that temperature of the mobile terminal 100 is maintained at the calibration reference temperature. The upper limit temperature is, for example, 45° C., and the calibration reference temperature is, for example, 40° C.

First, the processing execution unit 102 increases the arithmetic processing amount, and thereby temperature of the mobile terminal 100 rises. Time when temperature of the mobile terminal 100 reaches the threshold temperature is assumed to be t0. When current temperature reaches the upper limit temperature, the processing execution unit 102 stops arithmetic processing, and thereby temperature of the mobile terminal 100 goes down. Then, at time t1 when a predetermined time has elapsed from time t0, the processing execution unit 102 increases the arithmetic processing amount again, and thereby temperature of the mobile terminal 100 rises again. At time t3 until when temperature variation processing is performed three times, the processing execution unit 102 increases the arithmetic processing amount, and thereby temperature of the mobile terminal 100 rises. When temperature of mobile terminal 100 reaches the calibration reference temperature, the processing execution unit 102 controls the arithmetic processing amount such that the calibration reference temperature is maintained. Then, at time t4 which is a calibration operation point, the infrared detector 110 calibrates the conversion table.

Although cycle of the temperature variation processing illustrated in FIG. 8 is three times, the present disclosure is not limited thereto particularly, and the temperature variation processing may be performed by another frequency such as two times or four times or more.

Infrared radiant energy amount radiated from the mobile terminal 100 measured by the infrared measuring unit 112 of the infrared detector 110 is represented by a graph same as illustrated in FIG. 8.

FIG. 9 illustrates an example of the first conversion table in the first embodiment. As illustrated in FIG. 9, in the first conversion table, infrared radiant energy amount and temperature value are associated with each other. In FIG. 9, output resolution of the infrared measuring unit 112 is 8 bits. The first conversion table is generated by calibration of the infrared detector 110 on shipment from the factory. As illustrated in FIG. 9, for example, infrared radiant energy amount of 0×50 is converted to a temperature value of 40° C.

Figure 10:
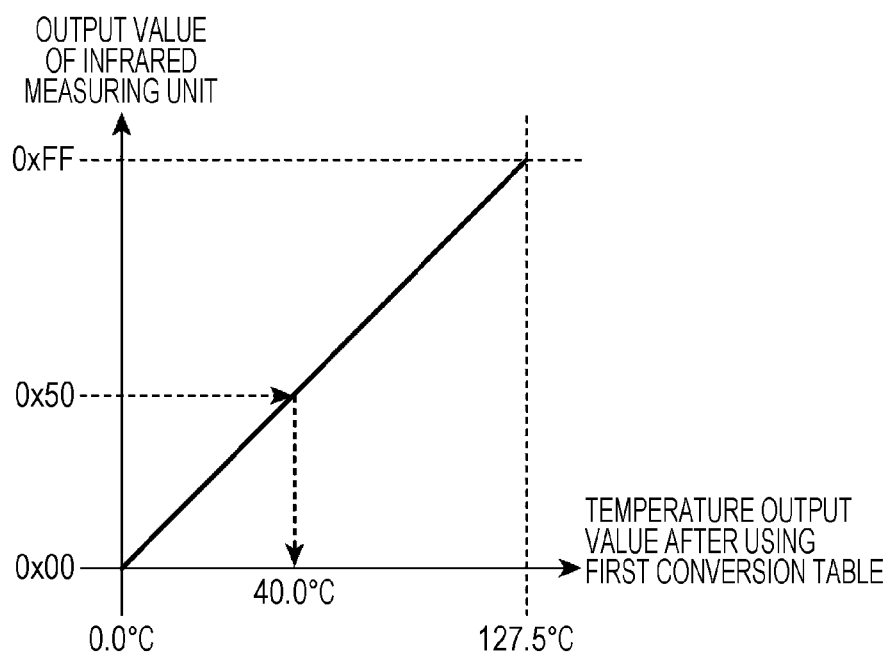
FIG. 10 illustrates a relationship between output value of the infrared measuring unit and temperature output value after using a first conversion table in the first embodiment.

FIG. 10 illustrates a relationship between output value of the infrared measuring unit and temperature output value after using the first conversion table in the first embodiment. In FIG. 10, the horizontal axis represents temperature value after using the first conversion table, and the vertical axis represents infrared radiant energy amount measured by the infrared measuring unit.

In a case where there is no change in the output value of the infrared measuring unit 112 since shipment from the factory, when the mobile terminal 100 generating heat at the calibration reference temperature of 40° C. is measured by the infrared measuring unit 112, infrared radiant energy amount measured by the infrared measuring unit 112 is 0×50, and thus infrared radiant energy amount may be converted to the temperature value correctly by using the first conversion table.

Figure 11:
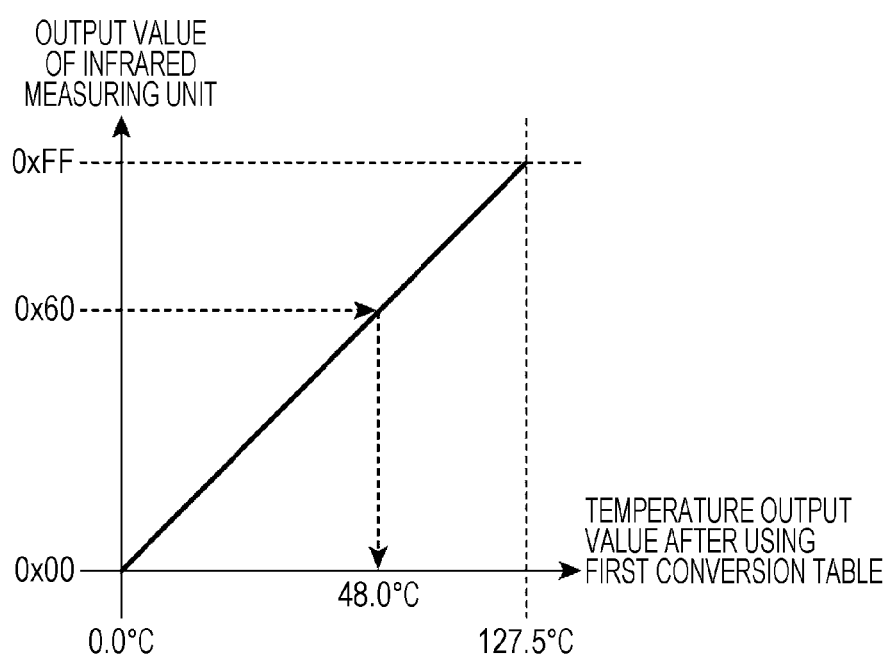
FIG. 11 illustrates a relationship between output value of the infrared measuring unit which has varied over time since shipment from the factory and temperature output value after using the first conversion table in the first embodiment.

FIG. 11 illustrates a relationship between output value of the infrared measuring unit varied over time since shipment from the factory and temperature output value after using the first conversion table in the first embodiment.

Assume that when the mobile terminal 100 generating heat at the calibration reference temperature of 40° C. is measured by the infrared measuring unit 112, infrared radiant energy amount measured by the infrared measuring unit 112 is 0×60. In this case, when infrared radiant energy amount is converted to the temperature value with the first conversion table, the converted temperature value is 48° C., which is different from the actual temperature value. Since infrared radiant energy amount to be measured should be 0×50, it is necessary to calibrate the first conversion table such that the measured infrared radiant energy amount is converted to a correct temperature value.

Figure 12:
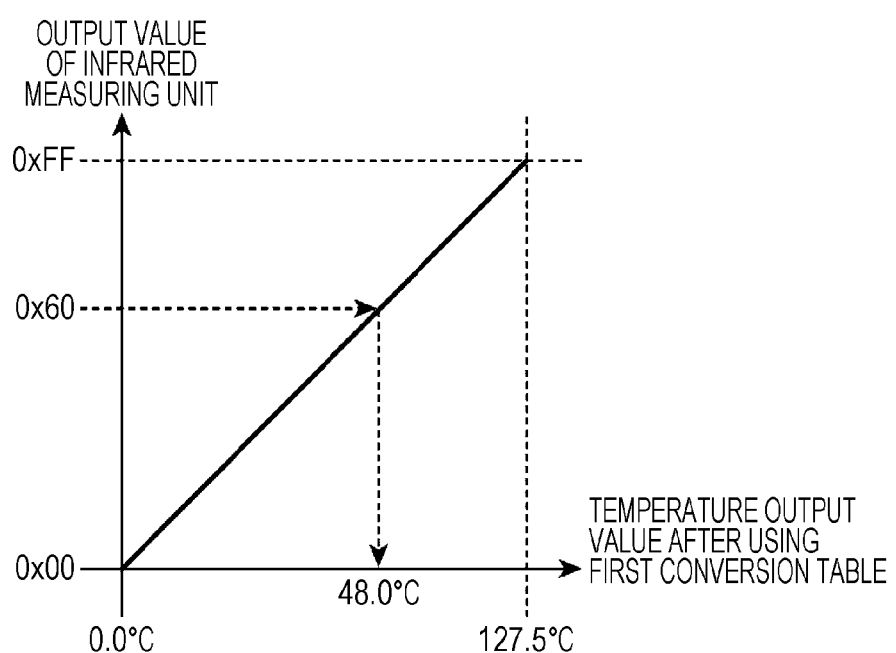
FIG. 12 illustrates a relationship between output value of the infrared measuring unit and temperature output value after using a second conversion table in the first embodiment.

FIG. 12 illustrates a relationship between output value of the infrared measuring unit and temperature output value after using the second conversion table in the first embodiment.

As illustrated in FIG. 12, when infrared radiant energy amount output by the infrared measuring unit 112 is 0×60, the conversion table generation unit 120 calibrates the first conversion table such that the temperature value becomes 40° C., and generates the second conversion table. In this operation, a gradient of a function indicating the relationship between infrared radiant energy amount of the first conversion table and the temperature value and a gradient of a function indicating the relationship between infrared radiant energy amount of the second conversion table and the temperature value are the same with each other.

Assuming that when the mobile terminal 100 generating heat at the calibration reference temperature of 40° C. is measured by the infrared measuring unit 112, temperature value of the first conversion table corresponding to infrared radiant energy amount is T1, and the calibration reference temperature of 40° C. is T2, the conversion table generation unit 120 calculates temperature value of the second conversion table based on the Formula (1) given below.

Temperature value of second conversion table=temperature value of first conversion table+(T2−T1)    (1)

FIG. 13 illustrates an example of the second conversion table in the first embodiment. The second conversion table illustrated in FIG. 13 associates infrared radiant energy amount and temperature value with each other in a same manner as the first conversion table illustrated in FIG. 9.

In the first embodiment, when the mobile terminal 100 generating heat at the calibration reference temperature of 40° C. is measured by the infrared measuring unit 112, the temperature value T1 of the first conversion table corresponding to infrared radiant energy amount is 48° C., and T2 is the calibration reference temperature of 40° C. Thus, from the Formula (1), temperature value of the second conversion table is a value subtracted by 8° C. from the temperature value of the first conversion table.

As above, in the first embodiment, the mobile terminal 100 is used as a heat source serving as a calibration reference and temperature of the heat source serving as the reference is varied at regular intervals. Thus, the infrared detector 110 may identify the position of the heat source serving as the reference, and thereby a conversion table converting infrared radiant energy amount to a temperature value may be calibrated easily.

Second Embodiment

Next, an infrared detection system according to the second embodiment is described. In the first embodiment, the infrared detector 110 identifies the position of the mobile terminal 100 serving as the heat source by detecting a periodic variation of the temperature of the mobile terminal 100 which is the heat source serving as the reference. In the second embodiment, the infrared detector 110 identifies the position of the mobile terminal 100 serving as the heat source by recognizing and detecting a pattern in which the mobile terminal 100 being the heat source serving as the reference moves.

Figure 14:
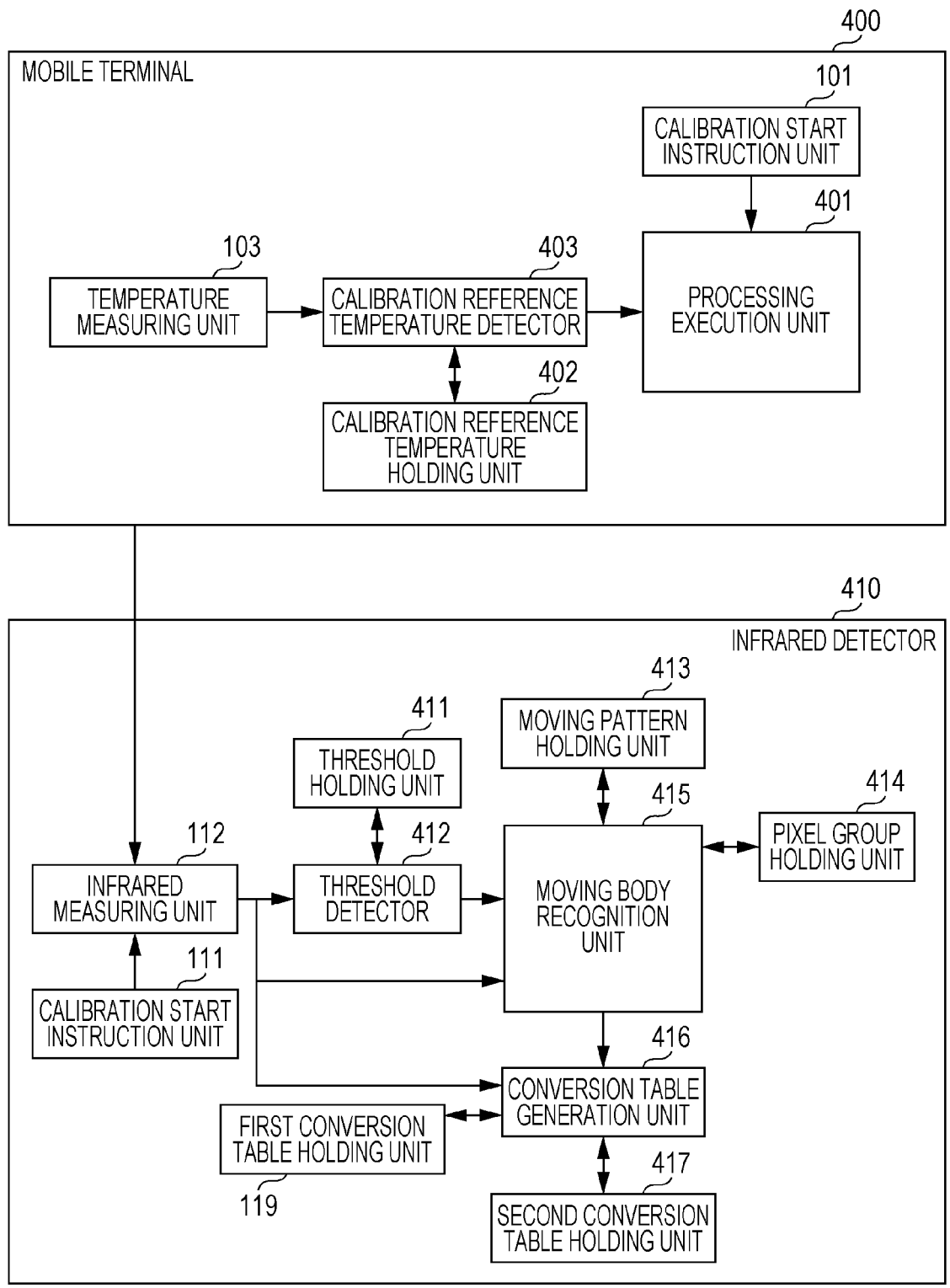
FIG. 14 illustrates a configuration of an infrared detection system according to a second embodiment.

FIG. 14 illustrates a configuration of the infrared detection system according to the second embodiment. The infrared detection system illustrated in FIG. 14 includes a mobile terminal 400 and an infrared detector 410. In the second embodiment, same reference numerals are assigned to components same as those in the first embodiment, and description thereof is omitted.

The mobile terminal 400 is, for example, a smartphone, a mobile phone, a tablet computer or notebook personal computer. The mobile terminal 400 includes a calibration start instruction unit 101, a processing execution unit 401, a temperature measuring unit 103, a calibration reference temperature holding unit 402, and a calibration reference temperature detector 403.

Upon receiving the calibration start instruction, the processing execution unit 401 executes temperature control processing to vary temperature of the mobile terminal 400. The processing execution unit 401 controls the heat generation amount of the mobile terminal 400 by increasing or decreasing the arithmetic processing amount such that temperature of the mobile terminal 400 becomes a predetermined reference temperature. The processing execution unit 401 increases the heat generation amount of the mobile terminal 400 by increasing the arithmetic processing amount and decreases the heat generation amount of the mobile terminal 400 by decreasing the arithmetic processing amount. The processing execution unit 401 performs natural cooling of the mobile terminal 400 by stopping arithmetic processing.

The calibration reference temperature holding unit 402 holds in advance information indicating the calibration reference temperature of the mobile terminal 100. The calibration reference temperature detector 403 detects that temperature of the mobile terminal 100 has reached the calibration reference temperature.

The infrared detector 410 detects infrared radiant energy amount radiated from the measuring range including a target, converts the detected infrared radiant energy amount to apparent temperature, and outputs a temperature distribution image. The imaging area is also the measuring range of the infrared measuring unit 112. Therefore, the imaging area may be referred to as the measuring range. The output temperature distribution image may be displayed on a display not illustrated.

The temperature distribution image is, for example, data indicated with the matrix, and the element included in the matrix is referred to as the pixel. The temperature distribution image includes multiple pixels. Each of the multiple pixels corresponds to an area included in the measurement range. The above areas corresponding to different pixels are different from each other.

The infrared detector 410 includes a calibration start instruction unit 111, an infrared measuring unit 112, a threshold holding unit 411, a threshold detector 412, a moving pattern holding unit 413, a pixel group holding unit 414, a moving body recognition unit 415, a first conversion table holding unit 119, a conversion table generation unit 416, and a second conversion table holding unit 417.

The threshold holding unit 411 holds in advance the threshold value of infrared radiant energy amount measured by the infrared measuring unit 112.

The threshold detector 412 detects whether infrared radiant energy amount of each pixel measured by the infrared measuring unit 112 exceeds the threshold value held by the threshold holding unit 411.

The moving pattern holding unit 413 holds in advance information indicating the moving pattern of the pixel group in which infrared radiant energy amount measured by the threshold detector 412 is determined to exceed the threshold value.

The pixel group holding unit 414 holds in advance a terminal area corresponding to information indicating the area of the pixel group in which infrared radiant energy amount exceeds the threshold value and which corresponds to the mobile terminal 400 as information indicating the size of the mobile terminal 400.

The moving body recognition unit 415 detects a temperature variation area (third area) corresponding to the mobile terminal 400 moving in a predetermined moving pattern based on a temporal change of the distribution of infrared radiant energy amount in the measuring range. Specifically, for example, the moving body recognition unit 415 detects a temperature variation area which is a temperature variation area corresponding to the size of the mobile terminal 400 and moves in a predetermined moving pattern. In the second embodiment, the moving body recognition unit 415 detects a temperature variation area corresponding to the mobile terminal 400 moving in a moving pattern from the measuring range when a user 10 moves the mobile terminal 400 in a predetermined moving pattern. Holding the mobile terminal 400 generating heat at the calibration reference temperature, the user 10 moves the mobile terminal 400 in a predetermined moving pattern. The moving body recognition unit 415 determines whether an area of the pixel group in which infrared radiant energy amount detected by the threshold detector 412 exceeds the threshold value matches a terminal area held by the pixel group holding unit 414. When determined that the area of the pixel group detected by the threshold detector 412 matches the terminal area held by the pixel group holding unit 414, the moving body recognition unit 415 identifies the pixel group as the temperature variation area.

In the second embodiment, the user 10 moves the mobile terminal 400 in a predetermined moving pattern. However, the present disclosure is not limited thereto, and a robot may move the mobile terminal 400 in a predetermined moving pattern.

The moving body recognition unit 415 determines whether the moving pattern of the temperature variation area corresponding to the mobile terminal 400 matches a moving pattern held in advance. The moving body recognition unit 415 recognizes that the moving pattern of the temperature variation area is a moving pattern held by the moving pattern holding unit 413. When recognized that the moving pattern of the temperature variation area is a moving pattern held in the moving pattern holding unit 413, the moving body recognition unit 415 detects the temperature variation area as an infrared radiant energy distribution area corresponding to the mobile terminal 400, and outputs a conversion table generation signal instructing generation of the conversion table to the conversion table generation unit 416. The infrared radiant energy distribution area corresponding to the mobile terminal 100 is an area where the infrared radiant energy amount radiated from the mobile terminal 100 is measured in the measuring range.

The conversion table generation unit 416 calibrates the first conversion table for converting infrared radiant energy amount to a temperature value based on the measured infrared radiant energy amount of the mobile terminal 100 and the calibration reference temperature. The conversion table generation unit 416 calibrates the first conversion table based on a correspondence relationship between infrared radiant energy amount in the detected temperature variation area and the calibration reference temperature. Upon receiving the conversion table generation signal from the moving body recognition unit 415, the conversion table generation unit 416 calibrates the first conversion table based on a correspondence relationship between infrared radiant energy amount of one pixel in the temperature variation area and the calibration reference temperature and generates the second conversion table.

The second conversion table holding unit 417 holds the second conversion table generated by the conversion table generation unit 416.

Figure 15:
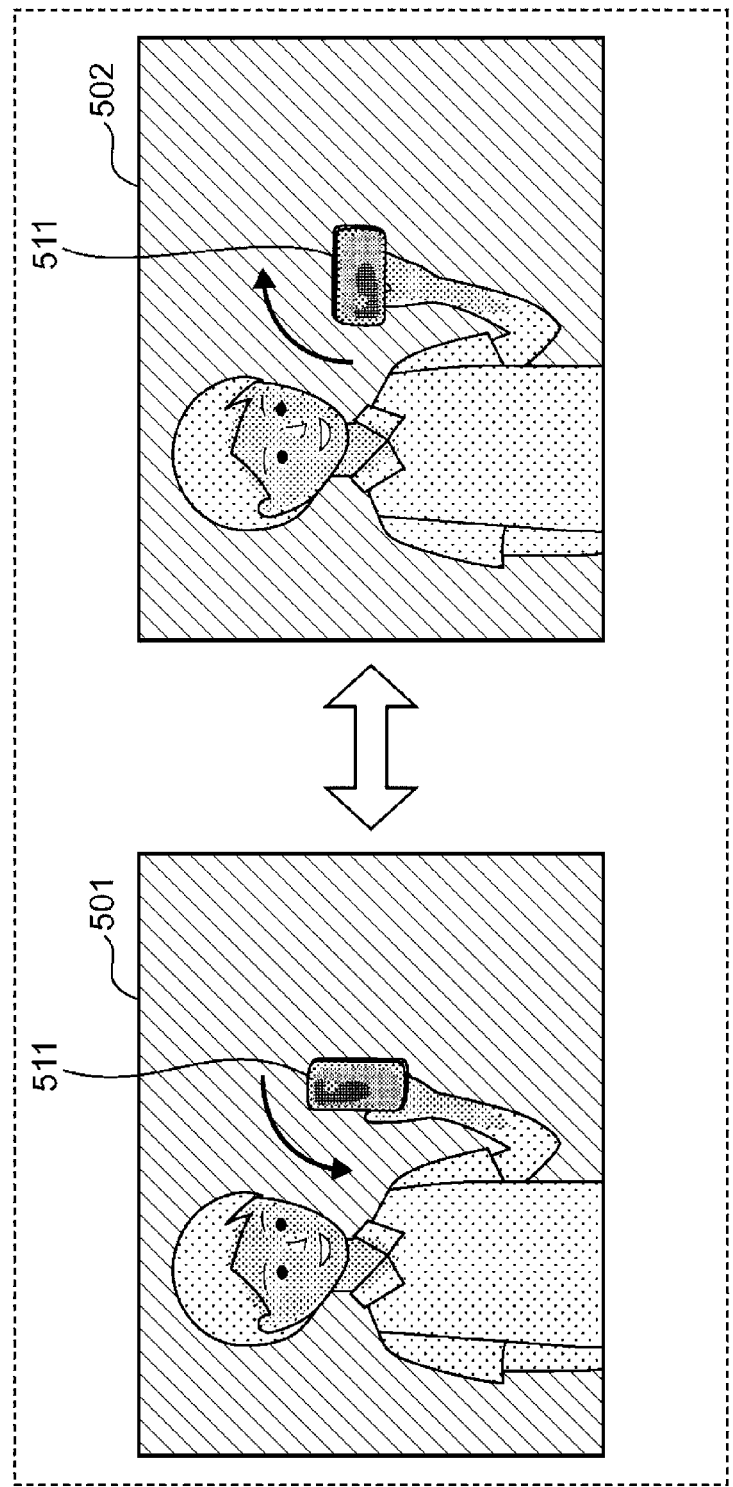
FIG. 15 illustrates recognition of a moving pattern according to the second embodiment.

FIG. 15 illustrates recognition of the moving pattern according to the second embodiment.

A temperature distribution image 501 illustrated in FIG. 15 is a temperature distribution image measured by the infrared measuring unit 112 when the user 10 holds the mobile terminal 400 generating heat at the calibration reference temperature, and hatching indicates that temperature of the pixel in a portion corresponding to the mobile terminal 400 is the calibration reference temperature. A temperature distribution image 502 is a temperature distribution image measured by the infrared measuring unit 112 when the user 10 laterally holds the mobile terminal 400 generating heat at the calibration reference temperature, and hatching indicates that temperature of the pixel in a portion corresponding to the mobile terminal 400 is the calibration reference temperature. The temperature distribution images 501 and 502 are represented by temperature distributions of different colors. In FIG. 15, the temperature distribution is represented by hatching. A temperature variation area 511 of the temperature distribution images 501 and 502 is a pixel group where infrared radiant energy amount higher than the threshold value is measured.

In the second embodiment, the moving pattern in which the temperature variation area 511 changes into a vertical state and a lateral state repeatedly is recognized, and thereby the temperature variation area 511 corresponding to the mobile terminal 400 in the temperature distribution image may be identified. The identified temperature variation area 511 is detected as an infrared radiant energy distribution area corresponding to the mobile terminal 400.

More specifically, the user 10 repeats operation of changing the position of the mobile terminal 400 generating heat at the calibration reference temperature from the vertical state to the lateral state, and then from the vertical state to the lateral state. The moving body recognition unit 415 of the infrared detector 410 identifies the temperature variation area 511 of the calibration reference temperature by recognizing the moving pattern repeatedly changing from the vertical state to the lateral state.

Figure 16:
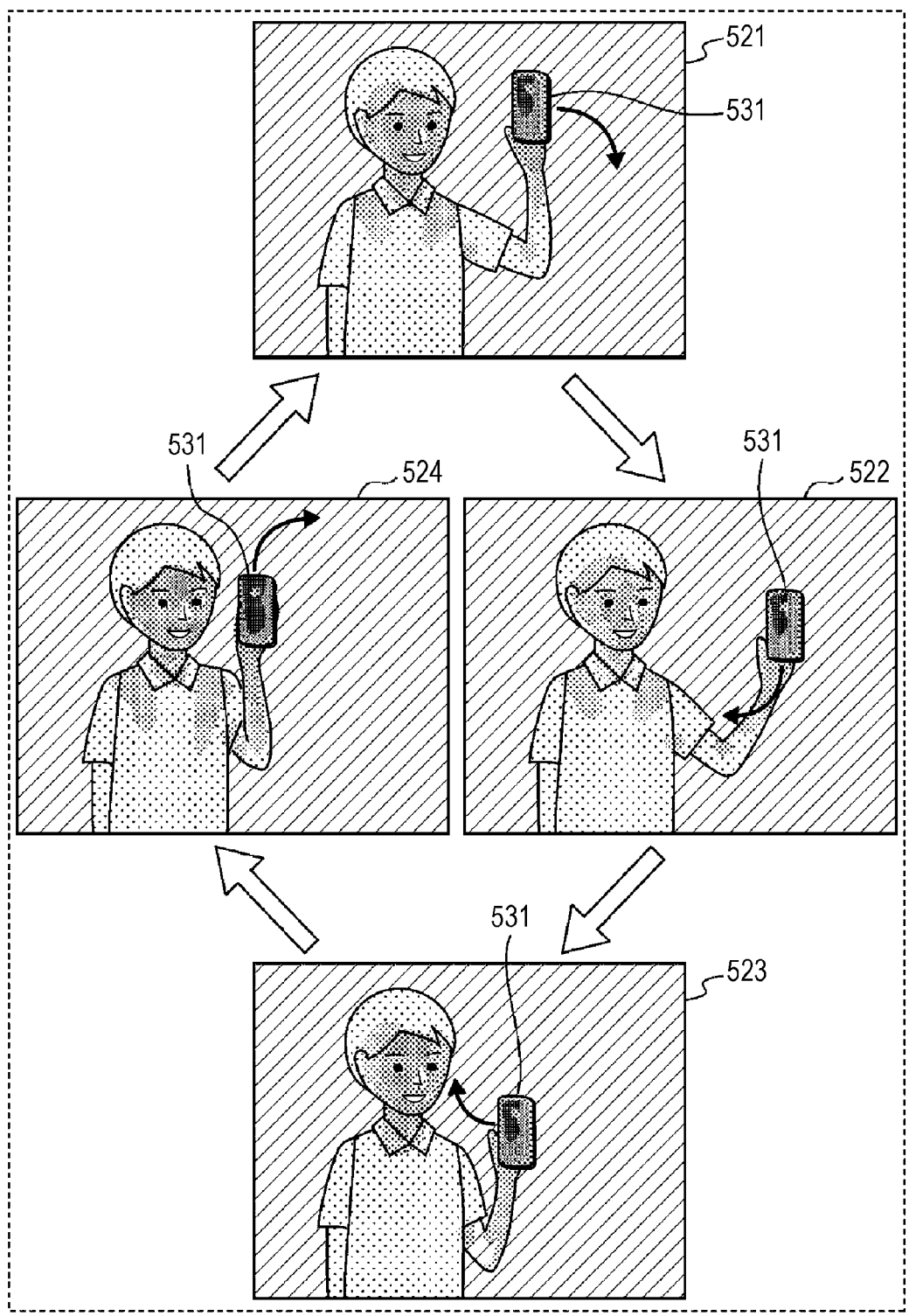
FIG. 16 illustrates recognition of a moving pattern according to a first modified example of the second embodiment.

FIG. 16 illustrates recognition of the moving pattern according to a first modified example of the second embodiment.

Temperature distribution images 521 to 524 illustrated in FIG. 16 are temperature distribution images measured by the infrared measuring unit 112 when the user 10 vertically holds the mobile terminal 400 generating heat at the calibration reference temperature, and hatching indicates that temperature of the pixel in a portion corresponding to the mobile terminal 400 is the calibration reference temperature. Temperature distribution images 521 to 524 are represented by temperature distributions of different colors. In FIG. 16, the temperature distribution is represented by hatching. In FIG. 16, the infrared detector 410 recognizes operating by the user 10 which moves the mobile terminal 400 in a circular pattern, and thereby identifies the position of the mobile terminal 400 generating heat at the calibration reference temperature. A temperature variation area 531 of temperature distribution images 521 to 524 is a pixel group where infrared radiant energy amount higher than the threshold value is measured.

In a first modified example of the second embodiment, the moving pattern in which the temperature variation area 531 varies in a cyclic pattern is recognized, and thereby the temperature variation area 531 corresponding to the mobile terminal 400 in the temperature distribution image may be identified.

More specifically, the user 10 depicts a circle with the mobile terminal 400 generating heat at the calibration reference temperature. The moving body recognition unit 415 of the infrared detector 410 identifies the temperature variation area 531 of the calibration reference temperature by recognizing the moving pattern which varies in a cyclic pattern.

In the second embodiment, in addition to the moving pattern which causes the mobile terminal 400 to change into a vertical state and a lateral state and the moving pattern which causes the mobile terminal 400 to move in a cyclic pattern, a moving pattern in which the mobile terminal 400 depicts a specific character such as an alphanumeric character or a specific shape may be recognized by the infrared detector 410.

Next, a temperature calibration method in the infrared detection system according to the second embodiment is described.

Figure 17:
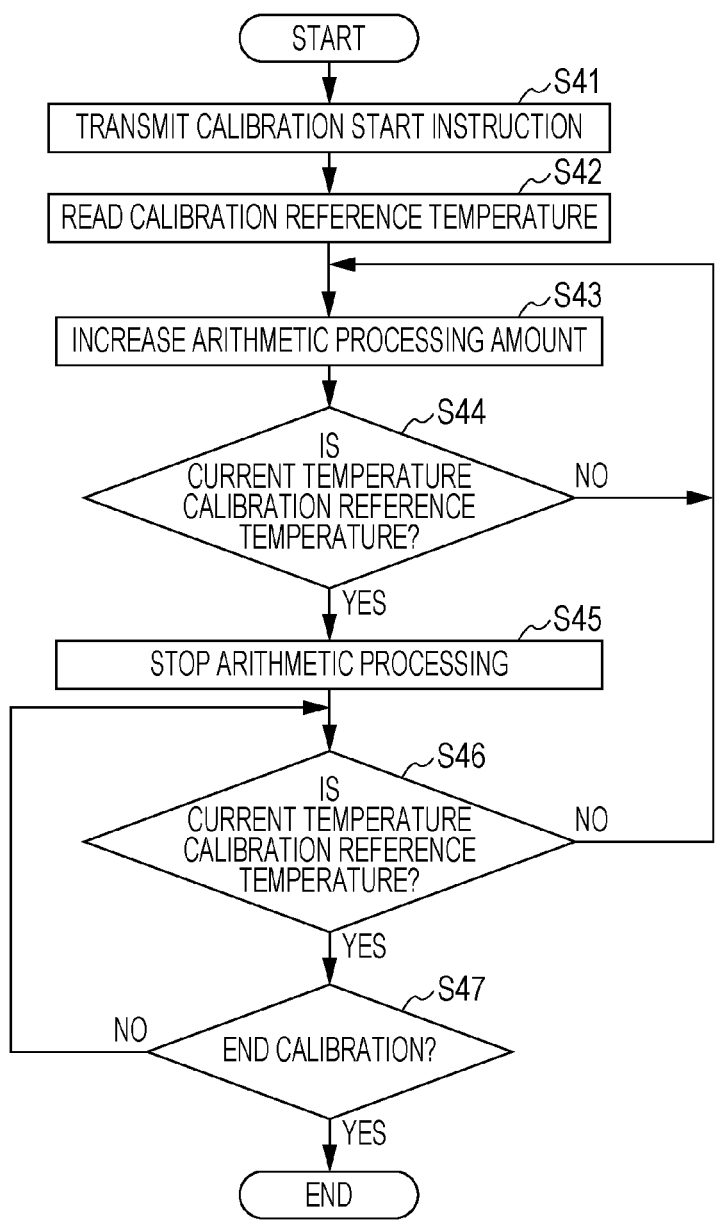
FIG. 17 is a flowchart for illustrating a temperature calibration method in a mobile terminal of the infrared detection system according to the second embodiment.

FIG. 17 is a flowchart for illustrating the temperature calibration method in the mobile terminal 400 of the infrared detection system according to the second embodiment.

First, in the step S41, the calibration start instruction unit 101 transmits calibration start instruction for starting calibration of the infrared detector 410 to the processing execution unit 401.

Next, in the step S42, the calibration reference temperature detector 403 reads calibration reference temperature from the calibration reference temperature holding unit 402.

Next, in the step S43, the processing execution unit 401 increases the arithmetic processing amount. As the arithmetic processing amount increases, temperature of the CPU and/or battery rises and thereby surface temperature of the mobile terminal 400 rises.

Next, in the step S44, the calibration reference temperature detector 403 determines whether current temperature of the mobile terminal 400 measured by the temperature measuring unit 103 is the calibration reference temperature. When determined that the current temperature is the calibration reference temperature, the calibration reference temperature detector 403 detects that temperature of the mobile terminal 400 has reached the calibration reference temperature and notifies the processing execution unit 401 that temperature of the mobile terminal 400 has reached the calibration reference temperature.

In this step, when determined that the current temperature is not the calibration reference temperature (step S44: NO), processing returns to the step S43, and the processing execution unit 401 increases the arithmetic processing amount.

Meanwhile, when determined that the current temperature is the calibration reference temperature (step S44: YES), the processing execution unit 401 stops arithmetic processing in the step S45. By stopping the arithmetic processing, surface temperature of the mobile terminal 400 is controlled so as not to rise higher than the calibration reference temperature.

Next, in the step S46, the calibration reference temperature detector 403 determines whether current temperature of the mobile terminal 400 measured by the temperature measuring unit 103 is the calibration reference temperature. When determined that the current temperature is the calibration reference temperature, the calibration reference temperature detector 403 detects that temperature of the mobile terminal 400 has reached the calibration reference table, and notifies the processing execution unit 401 that temperature of the mobile terminal 400 has reached the calibration reference temperature.

In this step, when determined that the current temperature is not the calibration reference temperature (step S46: NO), processing returns to the step S43, and the processing execution unit 401 increases the arithmetic processing amount.

Meanwhile, when determined that the current temperature is the calibration reference temperature (step S46: YES), in the step S47, the processing execution unit 401 determines whether to end calibration. Thus, temperature of the mobile terminal 400 is maintained at the calibration reference temperature by repeating the processing of increasing the arithmetic processing amount, the processing of determining whether current temperature is the calibration reference temperature, and the processing of stopping arithmetic processing. For example, the processing execution unit 401 determines to end calibration when application for calibrating the infrared detector 410 is ended according to operating by the user 10. The processing execution unit 401 may determine to end calibration after a predetermined time has passed since the current temperature is determined to be the calibration reference temperature.

While the mobile terminal 400 is generating heat at the calibration reference temperature, the user 10 moves the mobile terminal 400 in a predetermined moving pattern. When the current reaches the calibration reference temperature, the mobile terminal 400 may notify the user 10 by voice or image that the mobile terminal 400 is generating heat at the calibration reference temperature.

In this step, when determined not to end calibration (step S47: NO), processing returns to the step S46, and the calibration reference temperature detector 403 determines whether current temperature of the mobile terminal 400 measured by the temperature measuring unit 103 is the calibration reference temperature.

Meanwhile, when determined to end calibration (step S47: YES), the processing execution unit 401 ends temperature calibration processing of the mobile terminal 400.

Figure 18:
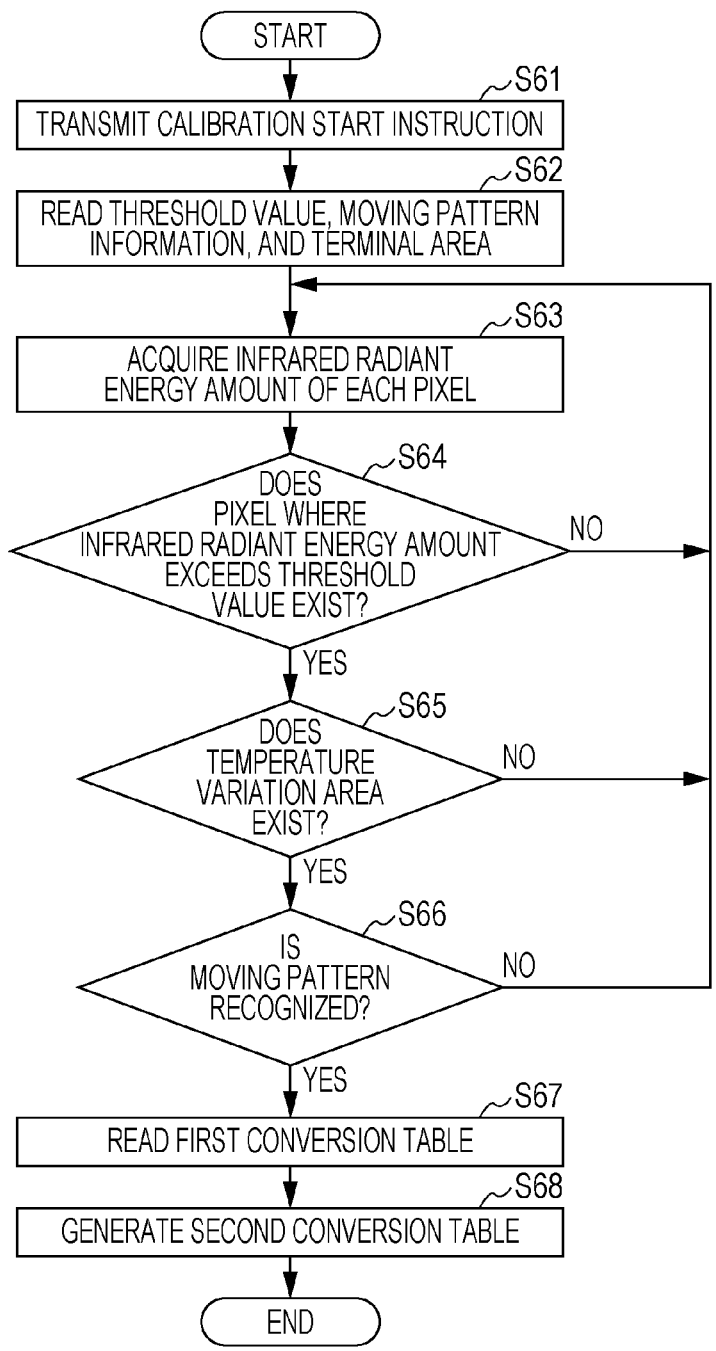
FIG. 18 is a flowchart for illustrating a temperature calibration method in the infrared detector of the infrared detection system according to the second embodiment.

FIG. 18 is a flowchart for illustrating a temperature calibration method in the infrared detector 410 of the infrared detection system according to the second embodiment.

First, in the step S61, the calibration start instruction unit 111 transmits calibration start instruction for starting calibration of the infrared detector 410 to the infrared measuring unit 112.

Next, in the step S62, the threshold detector 412 reads a threshold value of infrared radiant energy amount from the threshold holding unit 411, and the moving body recognition unit 415 reads moving pattern information indicating the moving pattern of a pixel group with infrared radiant energy amount larger than the threshold value from the moving pattern holding unit 413, and reads the terminal area from the pixel group holding unit 414.

Next, in the step S63, the threshold detector 412 acquires infrared radiant energy amount of each pixel in the measuring range measured by the infrared measuring unit 112.

Next, in the step S64, the threshold detector 412 determines whether a pixel with infrared radiant energy amount exceeding the threshold value exists in the measuring range. In this step, when determined that a pixel where infrared radiant energy amount exceeds the threshold value does not exist in the measuring range (step S64: NO), processing returns to the step S63, and the threshold detector 412 newly acquires measurement information indicating infrared radiant energy amount of each pixel in the measuring range newly measured by the infrared measuring unit 112.

Meanwhile, when determined that a pixel with infrared radiant energy amount exceeding the threshold value exists in the measuring range (step S64: YES), in the step S65, the moving body recognition unit 415 determines whether the temperature variation area exists in the measuring range. The moving body recognition unit 415 determines whether an area of the pixel group where infrared radiant energy amount detected by the threshold detector 412 exceeds the threshold value matches a terminal area held by the pixel group holding unit 414. When determined that the area of the pixel group detected by the threshold detector 412 matches the terminal area held by the pixel group holding unit 414, the moving body recognition unit 415 identifies the pixel group as the temperature variation area and determines that the temperature variation area exists.

The area of the pixel group detected by the threshold detector 412 and the terminal area need not to completely match each other, but may match substantially. Since the area of the pixel group corresponding to the mobile terminal 400 varies depending on the distance between the infrared detector 410 and the mobile terminal 400, the distance between the infrared detector 410 and the mobile terminal 400 is preferably a predetermined distance.

The pixel group holding unit 414 may hold in advance the shape of the pixel group where infrared radiant energy amount exceeds the threshold value and size of which corresponds to the mobile terminal 400 as a terminal shape corresponding to the shape of the mobile terminal 400. The moving body recognition unit 415 may determine whether the shape of the pixel group where infrared radiant energy amount detected by the threshold detector 412 exceeds the threshold value matches a terminal shape held by the pixel group holding unit 414. In this case, when determined that the shape of the pixel group detected by the threshold detector 412 matches the terminal shape held by the pixel group holding unit 414, the moving body recognition unit 415 identifies the pixel group as the temperature variation area.

In this step, when determined that the temperature variation area does not exist in the measuring range (step S65: NO), processing returns to the step S63, and the threshold detector 412 newly acquires measurement information indicating infrared radiant energy amount of each pixel in the measuring range newly measured by the infrared measuring unit 112.

Meanwhile, when determined that the temperature variation area exists (step S65: YES), in the step S66, the moving body recognition unit 415 determines whether the moving pattern of the temperature variation area is recognized. More specifically, when the moving pattern (locus of the temperature variation area) in which the identified temperature variation area moves in the measuring range matches a moving pattern indicated by the moving pattern information read from the moving pattern holding unit 413, the moving body recognition unit 415 determines that the moving pattern of the temperature variation area is recognized.

In this step, when determined that the moving pattern of the temperature variation area is not recognized (step S66: NO), processing returns to the step S63, and the threshold detector 412 newly acquires measurement information indicating infrared radiant energy amount of each pixel in the measuring range newly measured by the infrared measuring unit 112.

Meanwhile, when determined that the moving pattern of the temperature variation area is recognized (step S66: YES), in the step S67, the conversion table generation unit 416 reads the first conversion table from the first conversion table holding unit 119.

Next, in the step S68, the conversion table generation unit 416 calibrates the first conversion table for converting infrared radiant energy amount to a temperature value based on infrared radiant energy amount of one pixel in the identified temperature variation area and the calibration reference temperature, and generates the second conversion table. The conversion table generation unit 416 stores the generated second conversion table into the second conversion table holding unit 417. Description of the second conversion table generation method in the second embodiment is omitted as being the same as the second conversion table generation method in the first embodiment.

As above, in the second embodiment, the mobile terminal 400 is used as a heat source serving as a reference and the moving pattern of the mobile terminal 400 which is a heat source serving as the reference is recognized by the infrared detector 410. Thus, the infrared detector 410 may identify the position of the heat source serving as the reference, and thereby the first conversion table converting infrared radiant energy amount to a temperature value may be calibrated.

In the second embodiment, the moving pattern in which the mobile terminal 400 is moved is recognized by the infrared detector 410. However, the present disclosure is not limited thereto, and a hand shape of the user 10 holding the mobile terminal 400 may be recognized by the infrared detector 410.

Figure 19:
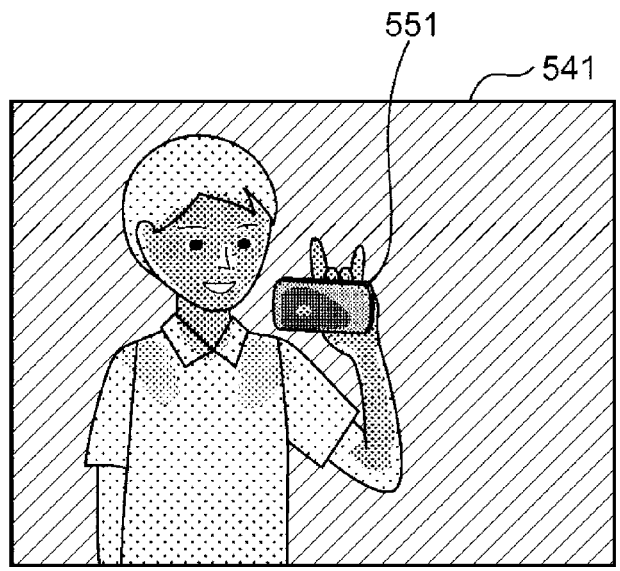
FIG. 19 is a diagram for illustrating recognition of a holding shape according to a second modified example of the second embodiment.

FIG. 19 is a diagram for illustrating recognition of a holding shape according to a second modified example of the second embodiment.

A temperature distribution image 541 illustrated in FIG. 19 is a temperature distribution image measured by the infrared measuring unit 112 when the user 10 holds mobile terminal 400 generating heat at the calibration reference temperature with vertically erected two fingers, and hatching indicates that temperature corresponding to infrared radiant energy amount of the pixel in a portion corresponding to the mobile terminal 400 is the calibration reference temperature. In the temperature distribution image 541, temperature distribution is represented by different colors. In FIG. 19, the temperature distribution is represented by hatching. A temperature variation area 551 of the temperature distribution image 541 is a pixel group where infrared radiant energy amount higher than the threshold value is measured.

In a second modified example of the second embodiment, a specific shape is recognized in the vicinity of the temperature variation area 551, and thereby the temperature variation area 551 corresponding to the mobile terminal 400 in the temperature distribution image may be identified.

In this case, the moving body recognition unit 415 detects a temperature variation area (fourth area) which is a temperature variation area corresponding to the size of the mobile terminal 400 and where an infrared radiant energy distribution area of a specific shape exists outside. The conversion table generation unit 416 calibrates the first conversion table based on a correspondence relationship between infrared radiant energy amount in the detected temperature variation area and the calibration reference temperature.

More specifically, the user 10 holds the mobile terminal 400 generating heat at the calibrated reference temperature in a state where two fingers are erected. The moving body recognition unit 415 of the infrared detector 410 recognizes the shape of two erected fingers and thereby identifies the temperature variation area 551 of the calibration reference temperature existing in the vicinity of the recognized shape.

Figure 20:
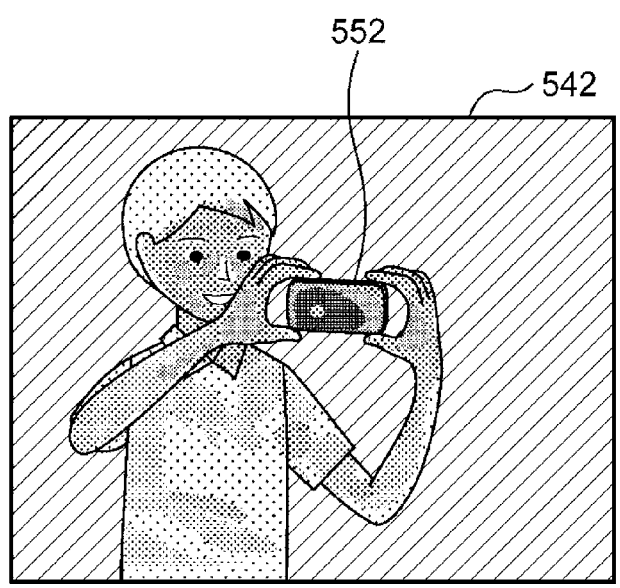
FIG. 20 is a diagram for illustrating recognition of a holding shape according to a third modified example of the second embodiment.

FIG. 20 is a diagram for illustrating recognition of the holding shape according to a third modified example of the second embodiment.

A temperature distribution image 542 illustrated in FIG. 20 is a temperature distribution image measured by the infrared measuring unit 112 when the user 10 holds the mobile terminal 400 generating heat at the calibration reference temperature in a state where a ring is formed with both hands, and hatching indicates that temperature corresponding to infrared radiant energy amount of the pixel in a portion corresponding to the mobile terminal 400 is the calibration reference temperature. In the temperature distribution image 542, temperature distribution is represented by different colors. In FIG. 20, the temperature distribution is represented by hatching. A temperature variation area 552 of the temperature distribution image 542 is a pixel group where infrared radiant energy amount higher than the threshold value is measured.

In the third modified example of the second embodiment, when an infrared radiant energy distribution area of a specific shape is recognized outside the temperature variation area 552, the temperature variation area 552 in the temperature distribution image may be identified as a temperature variation area corresponding to the mobile terminal 400. The moving body recognition unit 415 detects the identified temperature variation area 552 as an infrared radiant energy distribution area corresponding to the mobile terminal 400.

More specifically, the user 10 holds the mobile terminal 400 generating heat at the calibration reference temperature in a state where a ring is formed with both hands. The moving body recognition unit 415 of the infrared detector 410 recognizes the area of a substantially circular shape on both ends of the temperature variation area 552, and thereby identifies the temperature variation area 552 of the calibration reference temperature existing in the vicinity of the recognized area of the substantially circular shape.

Third Embodiment

Next, an infrared detection system according to a third embodiment is described. In the first and second embodiments, the infrared detector calibrates the first conversion table based on one calibration reference temperature and infrared radiant energy amount of the mobile terminal generating heat at the calibration reference temperature. In the third embodiment, the infrared detector calibrates the first conversion table based on two calibration reference temperatures and two infrared radiant energy amounts of the mobile terminal generating heat at two calibration reference temperatures.

Figure 21:
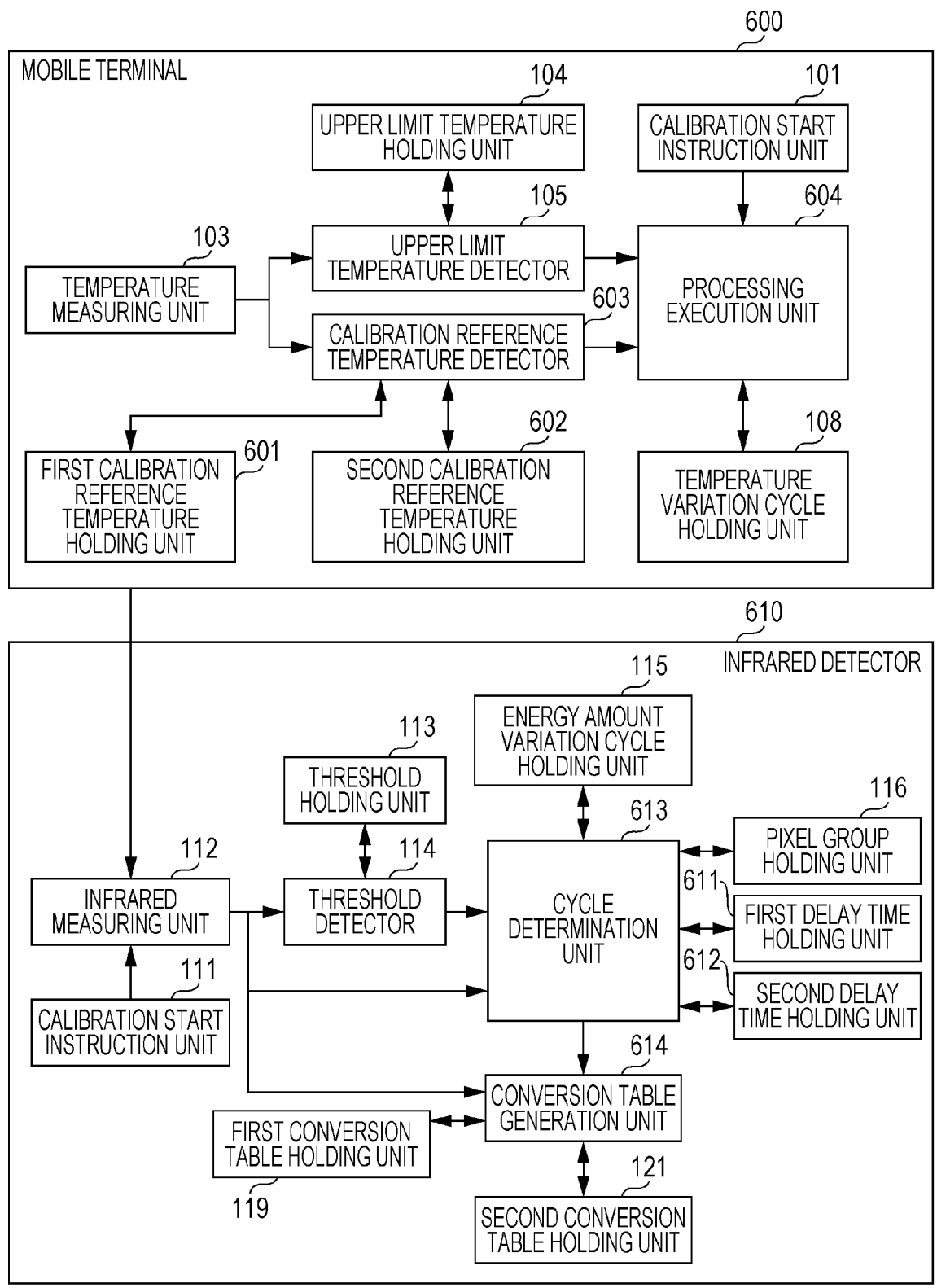
FIG. 21 illustrates a configuration of an infrared detection system according to a third embodiment.

FIG. 21 illustrates a configuration of the infrared detection system according to the third embodiment. The infrared detection system illustrated in FIG. 21 includes a mobile terminal 600 and an infrared detector 610. In the third embodiment, same reference numerals are assigned to components same as those in the first embodiment, and description thereof is omitted.

The mobile terminal 600 is, for example, a smartphone, a mobile phone, a tablet computer or notebook personal computer. The mobile terminal 600 includes a calibration start instruction unit 101, a temperature measuring unit 103, an upper limit temperature holding unit 104, an upper limit temperature detector 105, a first calibration reference temperature holding unit 601, a second calibration reference temperature holding unit 602, a calibration reference temperature detector 603, a processing execution unit 604, and a temperature variation cycle holding unit 108.

The first calibration reference temperature holding unit 601 holds in advance information indicating a first calibration reference temperature of the mobile terminal 600. The second calibration reference temperature holding unit 602 holds in advance information indicating a second calibration reference temperature of the mobile terminal 600. The first calibration reference temperature and the second calibration reference temperature are temperatures different from each other. For example, the second calibration reference temperature is lower than the first calibration reference temperature. The second calibration reference temperature may be higher than the first calibration reference temperature.

The calibration reference temperature detector 603 detects that temperature of the mobile terminal 600 has reached the first calibration reference temperature and detects that temperature of the mobile terminal 600 has reached the second calibration reference temperature.

Upon receiving the calibration start instruction, the processing execution unit 604 executes temperature control processing to vary temperature of the mobile terminal 600. The processing execution unit 604 controls the heat generation amount of the mobile terminal 600 by increasing or decreasing the arithmetic processing amount such that temperature of the mobile terminal 600 becomes the first calibration reference temperature or the second calibration reference temperature. The processing execution unit 604 increases the heat generation amount of the mobile terminal 600 by increasing the arithmetic processing amount and decreases the heat generation amount of the mobile terminal 600 by decreasing the arithmetic processing amount. The processing execution unit 604 performs natural cooling of the mobile terminal 600 by stopping arithmetic processing.

The processing execution unit 604 repeats the temperature variation processing of causing the mobile terminal 600 to generate heat up to a predetermined upper limit temperature by increasing the arithmetic processing amount, and then cooling the mobile terminal 600 down such that the temperature of the mobile terminal 600 becomes lower than a predetermined threshold temperature by stopping arithmetic processing in a predetermined cycle. After repeating the temperature variation processing in a predetermined cycle, the processing execution unit 604 controls the arithmetic processing amount such that temperature of the mobile terminal 600 is maintained at the first calibration reference temperature for a predetermined period of time. Then, after maintaining the first calibration reference temperature for a predetermined period of time, the processing execution unit 604 controls the arithmetic processing amount such that temperature of the mobile terminal 600 is maintained at the second calibration reference temperature for a predetermined period of time.

The infrared detector 610 detects infrared radiant energy amount radiated from the imaging area including a target, converts the detected infrared radiant energy amount to apparent temperature, and outputs an image indicating a temperature distribution. The imaging area is alternatively referred to as the measuring range. The output temperature distribution image may be displayed on a display not illustrated.

The infrared detector 610 includes a calibration start instruction unit 111, an infrared measuring unit 112, a threshold holding unit 113, a threshold detector 114, an energy amount variation cycle holding unit 115, a pixel group holding unit 116, a first delay time holding unit 611, a second delay time holding unit 612, a cycle determination unit 613, a first conversion table holding unit 119, a conversion table generation unit 614, and a second conversion table holding unit 121.

The first delay time holding unit 611 holds in advance a first delay time indicating a period of time from a time when temperature of the mobile terminal 600 is varied in a predetermined cycle to a time when temperature of the mobile terminal 600 reaches the first calibration reference temperature.

The second delay time holding unit 612 holds in advance a second delay time indicating a period of time from a time when the first delay time has elapsed to a time when temperature of the mobile terminal 600 reaches the second calibration reference temperature.

The cycle determination unit 613 detects a temperature variation area where temperature varies in a predetermined cycle, based on a temporal change of the distribution of infrared radiant energy amount in the measuring range. Specifically, for example, the cycle determination unit 613 determines whether the area of the pixel group in which infrared radiant energy amount detected by the threshold detector 114 exceeds the threshold value matches a terminal area held by the pixel group holding unit 116. When determined that the area of the pixel group detected by the threshold detector 114 matches the terminal area held by the pixel group holding unit 116, the cycle determination unit 613 identifies the pixel group as the temperature variation area.

The cycle determination unit 613 determines whether infrared radiant energy amount of the temperature variation area varies in an energy amount variation cycle held by the energy amount variation cycle holding unit 115. When determined that infrared radiant energy amount of the temperature variation area varies in an energy amount variation cycle held by the energy amount variation cycle holding unit 115, upon elapse of the first delay time held by the first delay time holding unit 611, the cycle determination unit 613 outputs to the conversion table generation unit 614 a first elapse notification signal notifying that the first delay time has passed. When the second delay time held by the second delay time holding unit 612 has passed from the time when the first delay time elapsed, the cycle determination unit 613 outputs to the conversion table generation unit 614 a second elapse notification signal notifying that the second delay time has passed.

The conversion table generation unit 614 calibrates the first conversion table for converting infrared radiant energy amount to a temperature value based on the measured infrared radiant energy amount of the mobile terminal 600, the first calibration reference temperature, and the second calibration reference temperature. The conversion table generation unit 614 calibrates the first conversion table based on a correspondence relationship between a first infrared radiant energy amount in the temperature variation area at a time when temperature of the mobile terminal 600 is the first calibration reference temperature and the first calibration reference temperature, and on a correspondence relationship between a second infrared radiant energy amount in the temperature variation area at a time when temperature of the mobile terminal 600 is the second calibration reference temperature and the second calibration reference temperature.

The conversion table generation unit 614 calibrates the first conversion table based on a correspondence relationship between infrared radiant energy amount in the temperature variation area (second area) at a time when infrared radiant energy amount in the predetermined cycle is high and the first calibration reference temperature, and on a correspondence relationship between infrared radiant energy amount in the temperature variation area (second area) at a time when infrared radiant energy amount in the predetermined cycle is low and the second calibration reference temperature.

Upon receiving the first elapse notification signal from the cycle determination unit 613, the conversion table generation unit 614 stores a first infrared radiant energy amount of one pixel in the temperature variation area. Upon receiving the second elapse notification signal from the cycle determination unit 613, the conversion table generation unit 614 calibrates the first conversion table based on a correspondence relationship between the stored infrared radiant energy amount and the first calibration reference temperature, and on a correspondence relationship between a second infrared radiant energy amount of one pixel in the temperature variation area and the second calibration reference temperature, and generates the second conversion table.

Figure 22:
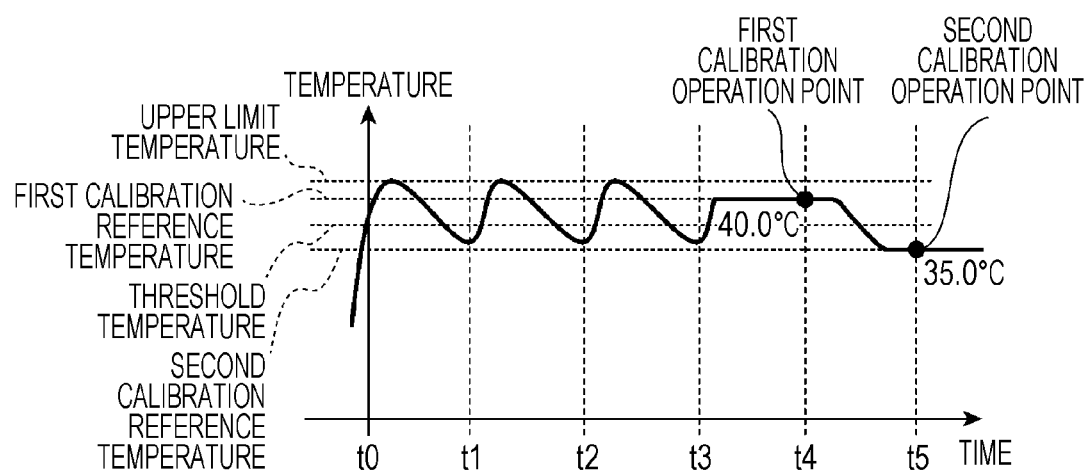
FIG. 22 illustrates a relationship between temperature of a mobile terminal and time in the third embodiment.

FIG. 22 illustrates a relationship between temperature of the mobile terminal and time in the third embodiment. In FIG. 22, the horizontal axis represents the time, and the vertical axis represents the temperature.

As illustrated in FIG. 22, in the third embodiment, temperature variation processing of cooling down the mobile terminal 600 is performed three times by causing the mobile terminal 600 to generate heat up to the upper limit temperature by increasing the arithmetic processing amount and then stopping the arithmetic processing. Thereafter, the arithmetic processing amount is controlled such that temperature of the mobile terminal 600 is maintained at the first calibration reference temperature. Further, the arithmetic processing amount is controlled such that temperature of the mobile terminal 600 is maintained at the second calibration reference temperature. The upper limit temperature is, for example, 45° C., the first calibration reference temperature is, for example, 40° C., and the second calibration reference temperature is, for example, 35° C.

First, the processing execution unit 604 increases the arithmetic processing amount, and thereby temperature of the mobile terminal 600 rises. Time when temperature of the mobile terminal 600 reaches the threshold temperature is assumed to be t0. When current temperature reaches the upper limit temperature, the processing execution unit 604 stops arithmetic processing, and thereby temperature of the mobile terminal 600 goes down. Then, at time t1 when a predetermined time has elapsed from time t0, the processing execution unit 604 increases the arithmetic processing amount again, and thereby temperature of the mobile terminal 600 rises again. At time t3 until when temperature variation processing is performed three times, the processing execution unit 604 increases the arithmetic processing amount, and thereby temperature of the mobile terminal 600 rises. When temperature of mobile terminal 600 reaches the first calibration reference temperature, the processing execution unit 604 controls the arithmetic processing amount such that the first calibration reference temperature is maintained. Then, at time t4 which is a first calibration operation point, the infrared detector 610 acquires infrared radiant energy amount of the temperature variation area.

Then, after the first calibration reference temperature is maintained for a predetermined period of time, the processing execution unit 604 stops arithmetic processing, and thereby temperature of the mobile terminal 600 goes down. When temperature of mobile terminal 600 reaches the second calibration reference temperature, the processing execution unit 604 controls the arithmetic processing amount such that the second calibration reference temperature is maintained. Then, at time t5 which is a second calibration operation point, the infrared detector 610 acquires infrared radiant energy amount of the temperature variation area and calibrates the conversion table.

Figure 23:
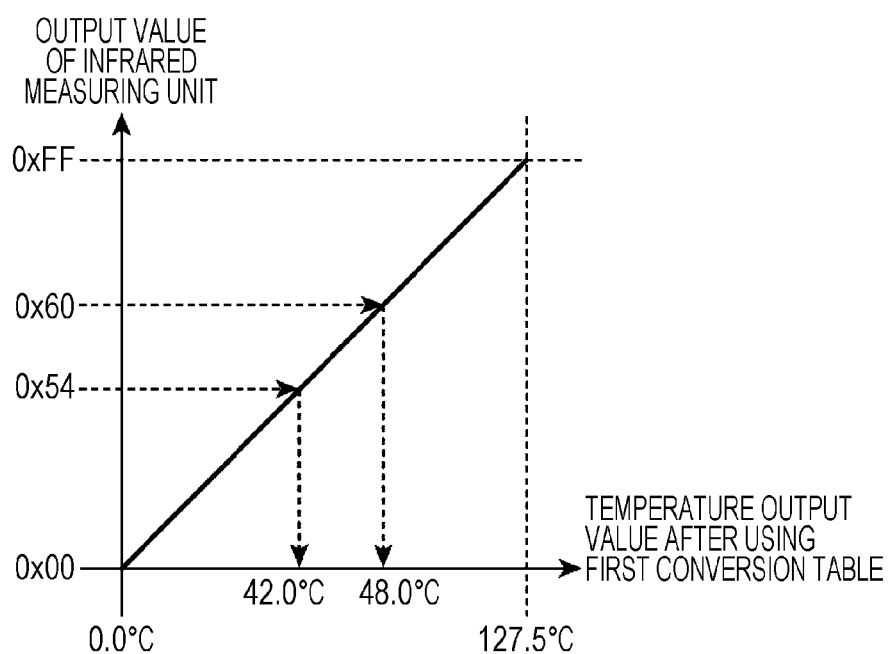
FIG. 23 illustrates a relationship between output value of the infrared measuring unit which has varied over time since shipment from the factory and temperature output value after using the first conversion table in the third embodiment.

FIG. 23 illustrates a relationship between output value of the infrared measuring unit which has varied over time since shipment from the factory and temperature output value after using the first conversion table in the third embodiment. The first conversion table of the third embodiment as of shipment from the factory is the same as the first conversion table illustrated in FIGS. 9 and 10.

Assume that when the mobile terminal 600 generating heat at the first calibration reference temperature of 40° C. is measured by the infrared measuring unit 112, infrared radiant energy amount measured by the infrared measuring unit 112 is 0×60. In this case, when infrared radiant energy amount is converted to the temperature value with the first conversion table, the converted temperature value is 48° C., which is different from the actual temperature value. Since infrared radiant energy amount which should be measured is 0×50, it is necessary to calibrate the first conversion table such that the measured infrared radiant energy amount is converted to a correct temperature value.

Assume that when the mobile terminal 600 generating heat at the second calibration reference temperature of 35° C. is measured by the infrared measuring unit 112, infrared radiant energy amount measured by the infrared measuring unit 112 is 0×54. In this case, when infrared radiant energy amount is converted to the temperature value with the first conversion table, the converted temperature value is 42° C., which is different from the actual temperature value. Therefore, it is necessary to calibrate the first conversion table such that the measured infrared radiant energy amount is converted to a correct temperature value.

Figure 24:
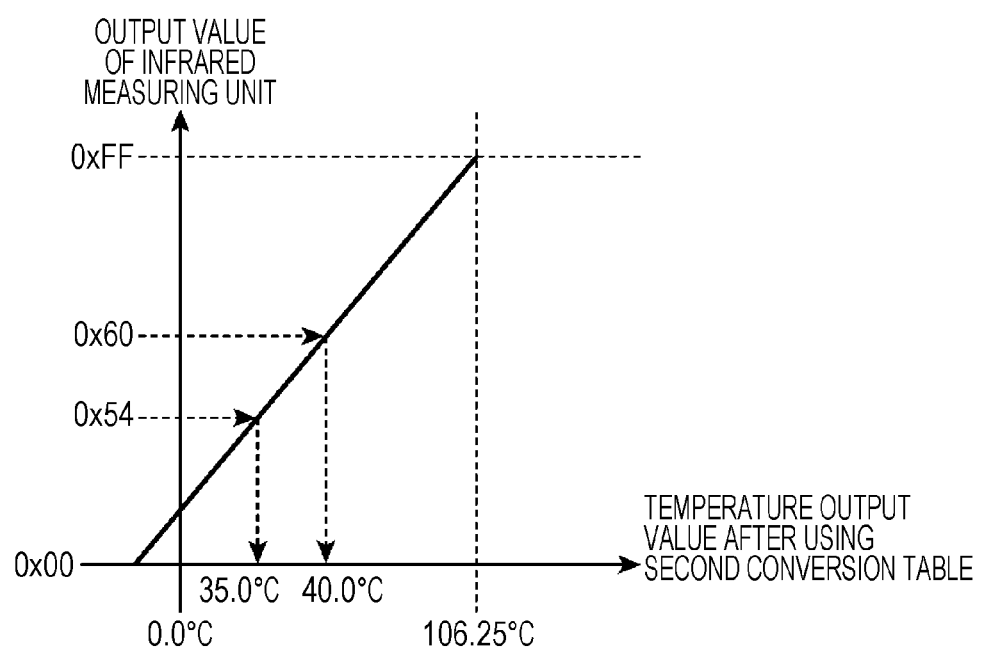
FIG. 24 illustrates a relationship between output value of the infrared measuring unit and temperature output value after using the second conversion table in the third embodiment.

FIG. 24 illustrates a relationship between output value of the infrared measuring unit and temperature output value after using the second conversion table in the third embodiment.

As illustrated in FIG. 24, the conversion table generation unit 614 calibrates the first conversion table such that when infrared radiant energy amount output by the infrared measuring unit 112 is 0×60, the temperature value becomes 40° C., and when infrared radiant energy amount is 0×54, the temperature becomes 35° C., and generates the second conversion table. In this operation, a gradient of a function indicating relationship between infrared radiant energy amount of the first conversion table and temperature value and a gradient of a function indicating relationship between infrared radiant energy amount of the second conversion table and the temperature value are different from each other. Thus, the conversion table generation unit 614 generates the second conversion table represented by a straight line connecting, with each other, a coordinate point where the value of the horizontal axis (x axis) is 40° C. and the value of the vertical axis (y axis) is 0×60 and a coordinate point where the value of the horizontal axis (x axis) is 35° C. and the value of the vertical axis (y axis) is 0×54.

As above, in the third embodiment, the mobile terminal 600 is used as a heat source serving as a calibration reference and temperature of the heat source serving as the reference is varied at regular intervals. Thus, the infrared detector 610 may identify the position of the heat source serving as the reference, and thereby easily calibrate a conversion table converting infrared radiant energy amount to a temperature value.

The mobile terminal 600 is controlled so as to generate heat at two temperatures, i.e. the first calibration reference temperature and the second calibration reference temperature which is different from the first calibration reference temperature. Then, the infrared detector 610 measures the first infrared radiant energy amount radiated from the mobile terminal 600 generating heat at the first calibration reference temperature, and measures the second infrared radiant energy amount radiated from the mobile terminal 600 generating heat at the second calibration reference temperature. The infrared detector 610 calibrates the first conversion table based on a correspondence relationship between the first infrared radiant energy amount and the first calibration reference temperature, and on a correspondence relationship between the second infrared radiant energy amount and the second calibration reference temperature, and generates the second conversion table.

Thus, the first conversion table is calibrated based on the two correspondence relationships, and thereby temperature of the infrared detector 610 may be calibrated more accurately.

The third embodiment also may be applied to the infrared detection system illustrated in the second embodiment. More specifically, the moving pattern may include a first moving pattern in which the mobile terminal 400 generating heat at the first calibration reference temperature moves, and a second moving pattern which is different from the first moving pattern and in which the mobile terminal 400 generating heat at the second calibration reference temperature different from the first calibration reference temperature moves. In this case, the moving body recognition unit 415 detects, out of the measuring range of infrared radiant energy amount, a first temperature variation area corresponding to the mobile terminal 400 which moves in the first moving pattern as an infrared radiant energy distribution area of the mobile terminal 400, and detects, out of the measuring range of infrared radiant energy amount, a second temperature variation area corresponding to the mobile terminal 400 which moves in the second moving pattern after moving in the first moving pattern as an infrared radiant energy distribution area of the mobile terminal 400. The conversion table generation unit 416 may calibrate the first conversion table based on a correspondence relationship between infrared radiant energy amount in the detected first temperature variation area and the first reference temperature, and on a correspondence relationship between infrared radiant energy amount in the detected second temperature variation area and the second reference temperature.

The moving body recognition unit 415 may detect a temperature variation area (third area) moving in the first moving pattern out of the measure range of infrared radiant energy amount indicated by measurement information. Thereafter, the moving body recognition unit 415 may detect the temperature variation area (third area) moving in the second moving pattern out of the measuring range of infrared radiant energy amount indicated by measurement information. For example, the moving body recognition unit 415 may detect the temperature variation area (third area) which moves in the second moving pattern after moving in the first moving pattern as the infrared radiant energy distribution area of the mobile terminal 400 based on a temporal change of the distribution of the infrared radiant energy amount in the measuring range indicated by the measurement information acquired in different timings. Then, the conversion table generation unit 416 may calibrate the first conversion table based on a correspondence relationship between infrared radiant energy amount in the temperature variation area (third area) at the time of moving in the detected first moving pattern and the first calibration reference temperature and on a correspondence relationship between infrared radiant energy amount in the temperature variation area (third area) at the time of moving in the detected second moving pattern and the second calibration reference temperature.

Fourth Embodiment

Next, an infrared detection system according to the fourth embodiment is described. In the first to third embodiments, the infrared detector and mobile terminal start calibration processing independently from each other. In the fourth embodiment, the infrared detector and mobile terminal start calibration processing in coordination.

Figure 25:
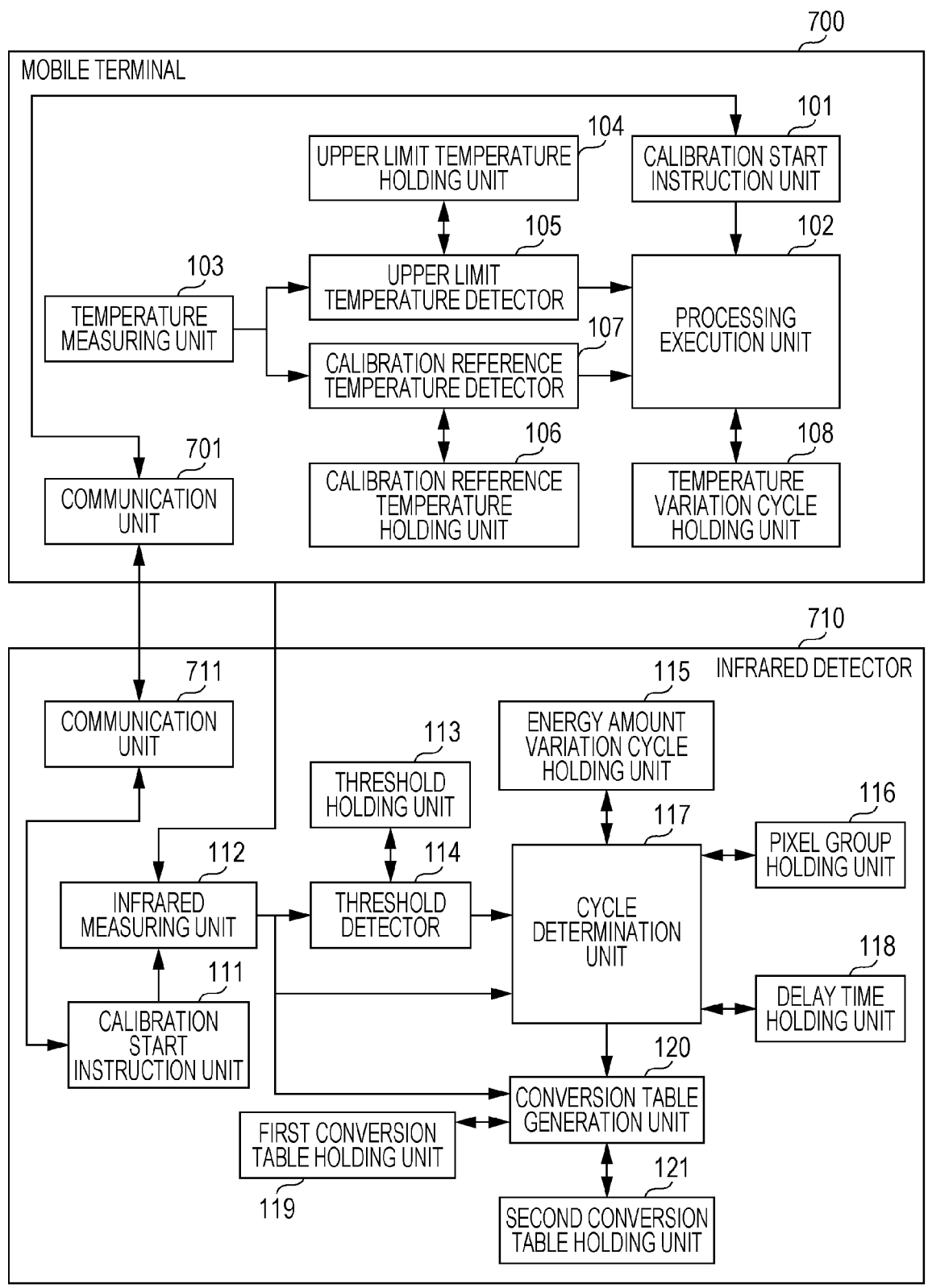
FIG. 25 illustrates a configuration of an infrared detection system according to a fourth embodiment.

FIG. 25 illustrates a configuration of the infrared detection system according to the fourth embodiment. The infrared detection system illustrated in FIG. 25 includes a mobile terminal 700 and an infrared detector 710. In the fourth embodiment, same reference numerals are assigned to components same as those in the first to third embodiments, and description thereof is omitted.

The mobile terminal 700 includes a calibration start instruction unit 101, a processing execution unit 102, a temperature measuring unit 103, an upper limit temperature holding unit 104, an upper limit temperature detector 105, a calibration reference temperature holding unit 106, a calibration reference temperature detector 107, a temperature variation cycle holding unit 108, and communication unit 701.

The communication unit 701 communicates with the infrared detector 710. Specifically, the communication unit 701 communicates information related to calibration processing by using a radio communication system or a wired communication system. For example, the communication unit 701 communicates with the infrared detector 710 by using a near field radio communication such as Wi-Fi (registered trademark) or Bluetooth (registered trademark). Radio communication or wired communication may be routed via a relay such as an access point in the middle of the communication path. Information related to calibration processing includes, for example, calibration start instruction. The communication unit 701 communicates information indicating start of processing with the infrared detector 710. The communication unit 701 may include, for example, a communication circuit as a hardware configuration.

The calibration start instruction unit 101 changes the mode of the mobile terminal 700 to the calibration mode based on information received by the communication unit 701, and transmits calibration start instruction for starting calibration of the infrared detector 710 to the processing execution unit 102. For example, when the communication unit 701 receives calibration start instruction, the calibration start instruction unit 101 changes the mode of the mobile terminal 700 to the calibration mode. In a manner same as the first embodiment, the calibration start instruction unit 101 may change the mode of the mobile terminal 700 to the calibration mode according to operating by a user 10 and cause the infrared detector 710 to transmit calibration start instruction to the communication unit 701.

The processing execution unit 102 controls the heat generation amount of the mobile terminal 700 by controlling the arithmetic processing amount such that temperature of the mobile terminal 700 becomes a predetermined calibration reference temperature.

The infrared detector 710 includes a calibration start instruction unit 111, an infrared measuring unit 112, a threshold holding unit 113, a threshold detector 114, an energy amount variation cycle holding unit 115, a pixel group holding unit 116, a cycle determination unit 117, a delay time holding unit 118, a first conversion table holding unit 119, a conversion table generation unit 120, a second conversion table holding unit 121, and a communication unit 711.

The communication unit 711 communicates with the mobile terminal 700. Specifically, the communication unit 711 communicates information related to calibration processing by using a radio communication system or a wired communication system. For example, the communication unit 711 communicates with the infrared detector 710 by using a near field communication such as Wi-Fi (registered trademark) or Bluetooth (registered trademark). The communication unit 711 may include, for example, a communication circuit as a hardware configuration.

The calibration start instruction unit 111 changes the mode of the infrared detector 710 to the calibration mode and transmits calibration start instruction for starting calibration of the infrared detector 710 to the infrared measuring unit 112. Further, the calibration start instruction unit 111 causes the communication unit 711 to transmit calibration start instruction to the mobile terminal 700. The calibration start instruction unit 111 may change the mode of the infrared detector 710 to the calibration mode based on information received by the communication unit 711. For example, when the communication unit 711 receives calibration start instruction from the mobile terminal 700, the calibration start instruction unit 111 changes the mode of the infrared detector 710 to the calibration mode.

As above, in the fourth embodiment, calibration processing of the mobile terminal 700 and infrared detector 710 is controlled by using a communication. Thus, calibration of the infrared detector 710 may be started just by operating either one of the mobile terminal 700 and the infrared detector 710. Thus, work load of the user 10 may be mitigated. Since timing of calibration processing may be adjusted, the mobile terminal 700 may be caused to generate heat in an efficient manner. Thus, power consumption of the mobile terminal 700 may be saved.

In the fourth embodiment, an example of the infrared detection system is described as a system based on the configuration of the first embodiment. However, the infrared detection system according to the fourth embodiment may be a system based on the configuration of the second or third embodiment.

In the present disclosure, whole or part of units, devices, members, section or whole or part of function blocks illustrated in block diagrams may be implemented by one or more electronic circuits including a semiconductor device, a semiconductor integrated circuit (IC) or a large scale integration (LSI). LSI or IC may be integrated on one chip or configured in combination with multiple chips. For example, function blocks other than the storage element may be integrated on one chip. LSI and IC herein referred to may be referred to in a different name depending on the integration degree, such as a system LSI, a very large scale integration (VLSI), or an ultra large scale integration (ULSI). The field programmable gate array (FPGA) programmed after production of the LSI or a reconfigurable logic device which enables reconfiguration of the connection relation inside the LSI or set-up of the circuit partition inside the LSI also may be used for the same purpose.

Further, whole or part of functions/operations of units, devices, members, section may be implemented by software processing. In this case, software is stored in a non-temporary recording media such as one or more ROMs, optical disk, and hard disk drives, and when the software is implemented by a processor, functions identified by the software are implemented by the processor and peripheral devices. A system or a device may include one or more non-temporary recording media, a processor, and a necessary hardware device such as an interface.

In the above embodiments, the threshold holding unit 113, energy amount variation cycle holding unit 115, pixel group holding unit 116, delay time holding unit 118, first conversion table holding unit 119, and second conversion table holding unit 121 may include, for example, a memory as a hardware configuration respectively.

The calibration reference temperature holding unit 402 in the above embodiments may include, for example, a memory as a hardware configuration.

Also, the first calibration reference temperature holding unit 601 and second calibration reference temperature holding unit 602 in the above embodiments may include, for example, a memory as a hardware configuration respectively.

The information processing method, information processing system, mobile terminal, infrared detector, and a non-transitory computer readable recording medium storing a program according to the present disclosure perform temperature calibration of the infrared detector in an actually used environment at a low cost and in an easy manner, and are useful as an information processing method, an information processing system, a mobile terminal, an infrared detector, and a non-transitory computer readable recording medium storing a program for the infrared detector which measures infrared radiant energy amount of a measuring target and converts the measured infrared radiant energy amount to a temperature value.

What is claimed is:

1. An information processing method comprising:
   acquiring measurement information pieces each indicating a distribution of infrared radiant energy in a measuring range including a mobile terminal, wherein each of the measurement information pieces is obtained by measuring amounts of infrared radiant energy in areas into which the measuring range is divided, wherein the measuring is performed at different timings during a predetermined period, and wherein the mobile terminal cyclically increases and decreases its temperature during the predetermined period by increasing and decreasing an amount of arithmetic processing performed by a processing execution unit thereof;
   acquiring information indicating a predetermined temperature;
   determining an infrared radiant energy distribution area, in the measuring range, which is an area where an amount of infrared radiant energy emitting from the mobile terminal is measured, based on the measurement information pieces, wherein the determined infrared radiant energy distribution area is an area where the measured amount of infrared radiant energy varies cyclically during the predetermined period;
   measuring an amount of infrared radiant energy in the determined infrared radiant energy distribution area after the predetermined period is elapsed and when the mobile terminal is at the predetermined temperature; and
   calibrating a conversion table for converting an infrared radiant energy amount listed therein to a temperature value, based on the predetermined temperature and the measured amount of infrared radiant energy in the determined infrared radiant energy distribution area.

2. The information processing method according to claim 1, wherein the information processing method further comprises:
   acquiring size information indicating a size of the mobile terminal,
   wherein, the determined infrared radiant energy distribution area has a size corresponding to the size of the mobile terminal, and
   wherein, in the calibrating of the conversion table, the conversion table is calibrated based on a correspondence relationship between the measured amount of infrared radiant energy in the determined infrared radiant energy distribution area and the predetermined temperature.

3. The method according to claim 1, wherein
   the predetermined temperature includes a first predetermined temperature and a second predetermined temperature which is lower than the first predetermined temperature;
   in the measuring of the amount of infrared radiant energy in the determined infrared radiant energy distribution area, a first amount and a second amount of infrared radiant energy in the identified infrared radiant energy distribution area are measured as the amount of infrared radiant energy in the identified infrared radiant energy distribution area,
   the first amount is an amount of infrared radiant energy which is measured in the identified infrared radiant energy distribution area when the mobile terminal is at the first predetermined temperature,
   the second amount is an amount of infrared radiant energy which is measured in the identified infrared radiant energy distribution area when the mobile terminal is at the second predetermined temperature, and
   in the calibrating of the conversion table, the conversion table is calibrated based on a correspondence relationship between the measured first amount of infrared radiant energy in the determined infrared radiant energy distribution area and the first predetermined temperature and on a correspondence relationship between the measured second amount of infrared radiant energy in the determined infrared radiant energy distribution area and the second predetermined temperature.

4. The information processing method according to claim 2, wherein
   in the determining of the infrared radiant energy distribution area corresponding to the mobile terminal, in a case where there is a predetermined distribution of infrared radiant energy outside of the area where the measured amount of infrared radiant energy varies cyclically during the predetermined period, the area in which there is a predetermined distribution of infrared radiant energy outside of the area where the measured amount of infrared radiant energy varies cyclically during the predetermined period is determined as the infrared radiant energy distribution area corresponding to the mobile terminal.

5. An information processing system comprising:
a mobile terminal; and
an infrared detector, wherein
the mobile terminal includes:
　a temperature measuring unit which measures a temperature of the mobile terminal; and
　a processing execution unit that cyclically increases and decreases its temperature during a predetermined period by increasing and decreasing an amount of arithmetic processing,
　wherein, after the predetermined period is elapsed, the processing execution unit further controls an amount of heat generation of the mobile terminal by controlling the arithmetic processing amount such that a temperature of the mobile terminal becomes a predetermined temperature, and wherein
the infrared detector includes:
　an infrared measuring unit which measures amounts of infrared radiant energy in areas into which a measuring range is divided, wherein the mobile terminal is in the measuring range, wherein the amounts of infrared radiant energy in the areas are measured to obtain a distribution of infrared radiant energy in the measuring range, wherein the measurements are performed at different timings during the predetermined period and wherein the mobile terminal cyclically increases and decreases its temperature during the predetermined period by increasing and decreasing the amount of arithmetic processing;
　a storage unit which stores information indicating the predetermined temperature;
　a determination unit which determines an infrared radiant energy distribution area, in the measuring range, which is an area where an amount of infrared radiant energy emitting from the mobile terminal is measured, based on the amounts of infrared radiant energy measured at the different timings, wherein the determined infrared radiant energy distribution area is an area where the measured amount of infrared radiant energy varies cyclically during the predetermined period, wherein, the infrared measuring unit further measures an amount of infrared radiant energy in the determined infrared radiant energy distribution area after the predetermined period is elapsed and when the mobile terminal is at the predetermined temperature, and
　a calibration unit which calibrates a conversion table for converting an infrared radiant energy amount listed therein to a temperature value based on the predetermined temperature and the measured amount of infrared radiant energy in the detected infrared radiant energy distribution area.

6. A mobile terminal used in an information processing system, the mobile terminal comprising:
a communication unit which transmits information indicating start of processing to an infrared detector used in the information processing system;
a temperature measuring unit which measures a temperature of the mobile terminal; and
a processing execution unit that cyclically increases and decreases its temperature during a predetermined period by increasing and decreasing an amount of arithmetic processing performed by the processing execution unit, after the transmission of the information, to the infrared detector, indicating the start of the processing, wherein the predetermined period is a period during which the infrared detector measures amounts of infrared radiant energy in areas into which a measuring range of the infrared detector is divided and wherein the mobile terminal is in the measuring range of the infrared detector,
wherein, after the predetermined period is elapsed, the processing execution unit further controls an amount of heat generation of the mobile terminal by controlling the amount of arithmetic processing such that the temperature of the mobile terminal becomes a predetermined temperature, and
wherein, the infrared detector further measures an amount of infrared radiant energy in the determined infrared radiant energy distribution area corresponding to the mobile terminal after the predetermined period is elapsed and when the mobile terminal is at the predetermined temperature, and calibrates a conversion table for converting an infrared radiant energy amount listed therein to a temperature value based on the predetermined temperature and the measured amount of infrared radiant energy in the detected infrared radiant energy distribution area.

7. An infrared detector used in an information processing system, the infrared detector comprising:
an infrared measuring unit which measures amounts of infrared radiant energy in areas into which a measuring range is divided, wherein a mobile terminal is in the measuring range, wherein the mobile terminal is a mobile terminal used in the information processing system, wherein the amounts of infrared radiant energy in the areas are measured to obtain a distribution of infrared radiant energy in the measuring range, wherein the measurements are performed at different timings during a predetermined period and wherein the mobile terminal cyclically increases and decreases its temperature during the predetermined period by increasing and decreasing an amount of arithmetic processing performed by a processing execution unit thereof;
a storage unit which stores information indicating a predetermined temperature;
a determiner which determines an infrared radiant energy distribution area, in the measuring range, which is an area where an amount of infrared radiant energy emitting from the mobile terminal is measured, based on the distributions of infrared radiant energy in the measuring range obtained at the different timings, wherein the determined infrared radiant energy distribution area is an area where the measured amount of infrared radiant energy varies cyclically during the predetermined period, and
　wherein, the infrared measuring unit further measures an amount of infrared radiant energy in the determined infrared radiant energy distribution area corresponding to the mobile terminal after the predetermined period is elapsed and when the mobile terminal is at the predetermined temperature, and
a calibration unit which calibrates a conversion table for converting an infrared radiant energy amount list therein to a temperature value based on the predetermined temperature and the measured amount of infrared radiant energy in the detected infrared radiant energy distribution area.

8. An information processing method comprising:
acquiring measurement information pieces each indicating a distribution of infrared radiant energy in a measuring range including a mobile terminal, wherein each of the measurement information pieces is obtained by measuring amounts of infrared radiant energy in areas into which the measuring range is divided, wherein the measuring is performed at different timings during a predetermined period, and wherein the mobile terminal moves in a predetermined moving pattern at a predetermined temperature during the predetermined period;

acquiring information indicating the predetermined temperature and size information indicating a size of the mobile terminal;

determining an infrared radiant energy distribution area, in the measuring range which is an area where an amount of infrared radiant energy emitting from the mobile terminal is measured, based on the measurement information pieces, wherein the determined infrared radiant energy distribution area is an area in which a position at which the amount of infrared radiant energy exceeding a threshold value is measured changes in accordance with the predetermined moving pattern during the predetermined period, and whose size corresponds to the size of the mobile terminal; and calibrating a conversion table for converting an infrared radiant energy amount listed therein to a temperature value, based on the predetermined temperature and the measured amount of infrared radiant energy in the determined infrared radiant energy distribution area.

9. The information processing method according to claim 8, wherein the predetermined temperature includes a first predetermined temperature and a second predetermined temperature which is lower than the first predetermined temperature;

the predetermined moving pattern includes a first moving pattern and a second moving pattern which is different from the first moving pattern;

while the measuring is performed, the mobile terminal moves in the first moving pattern at the first predetermined temperature, thereafter moves in the second moving pattern at the second predetermined temperature;

wherein, in the determining of the infrared radiant energy distribution area, the determined infrared radiant energy distribution area is (i) an area in which a position at which a first amount of infrared radiant energy exceeding the threshold value is measured changes in accordance with the predetermined moving pattern while the mobile terminal moves in the first moving pattern and (ii) an area in which a position at which a second amount of infrared radiant energy exceeding the first amount of infrared radiant energy is measured changes in accordance with the predetermined moving pattern while the mobile terminal moves in the second moving pattern, and in the calibrating of the conversion table, the conversion table is calibrated based on a correspondence relationship between the measured first amount of infrared radiant energy and the first predetermined temperature and on a correspondence relationship between the measured second amount of infrared radiant energy and the second predetermined temperature.

* * * * *